(12) United States Patent
Gupta et al.

(10) Patent No.: US 11,949,997 B2
(45) Date of Patent: Apr. 2, 2024

(54) ELECTRONIC DEVICE WITH SHUTTER ASSEMBLY

(71) Applicant: Amazon Technologies, Inc., Seattle, WA (US)

(72) Inventors: Rahul Gupta, Bothell, WA (US); Oszkar Tiberius Bajko, Issaquah, WA (US); Kristina Perez de Tagle, Kent, WA (US); Hung-Bing Tan, Seattle, WA (US); Mona Mayeh, Seattle, WA (US); Martin Peter Aalund, Seattle, WA (US); Sudarshan Rangaraj, Seattle, WA (US); Arivazhagan Chandrashekaran, Issaquah, WA (US); Pierre Della Nave, London (GB)

(73) Assignee: Amazon Technologies, Inc., Seattle, WA (US)

( * ) Notice: Subject to any disclaimer, the term of this patent is extended or adjusted under 35 U.S.C. 154(b) by 144 days.

(21) Appl. No.: 17/201,194

(22) Filed: Mar. 15, 2021

(65) Prior Publication Data

US 2022/0294993 A1    Sep. 15, 2022

(51) Int. Cl.
*H04N 23/90* (2023.01)
*H04N 23/58* (2023.01)
*H04N 23/62* (2023.01)
*H04N 23/695* (2023.01)

(52) U.S. Cl.
CPC ............. *H04N 23/90* (2023.01); *H04N 23/58* (2023.01); *H04N 23/62* (2023.01); *H04N 23/695* (2023.01)

(58) Field of Classification Search
None
See application file for complete search history.

(56) References Cited

U.S. PATENT DOCUMENTS

| | | | |
|---|---|---|---|
| 8,619,111 B2 | 12/2013 | Roach, Jr. | |
| 8,902,318 B1* | 12/2014 | Haddad | H04N 5/23245 348/222.1 |
| 10,104,210 B1 | 10/2018 | Zenebe | |
| 2004/0088077 A1 | 5/2004 | Jouppi et al. | |
| 2009/0189973 A1 | 7/2009 | Root et al. | |
| 2012/0040716 A1 | 2/2012 | Kuncl et al. | |
| 2012/0175232 A1* | 7/2012 | Shukla | H01H 15/10 200/341 |

(Continued)

FOREIGN PATENT DOCUMENTS

CN    207460391 U    6/2018

OTHER PUBLICATIONS

Office Action for U.S. Appl. No. 17/201,174, dated Oct. 29, 2021, Gupta, "Audiovisual Device", 20 pages.

(Continued)

*Primary Examiner* — James M Anderson, II
(74) *Attorney, Agent, or Firm* — Lee & Hayes P.C.

(57) ABSTRACT

A device include a first camera, a second camera, and a shutter assembly. The shutter assembly includes a switch, a link coupled to the switch and having a first cover, and an arm coupled to the link and having a second cover. Actuating the switch to a first position disposes the first cover within a first field of view of the first camera and the second cover within a second field of view of the second camera. Actuating the switch to a second position disposes the first cover outside of the first field of view and the second cover outside of the second field of view.

20 Claims, 23 Drawing Sheets

(56) References Cited

U.S. PATENT DOCUMENTS

| | | |
|---|---|---|
| 2012/0207332 A1 | 8/2012 | Dehe |
| 2013/0242207 A1 | 9/2013 | Hiramatsu et al. |
| 2013/0342638 A1 | 12/2013 | Sobti et al. |
| 2014/0022281 A1 | 1/2014 | Georgeson et al. |
| 2014/0110231 A1* | 4/2014 | Kibiti .................... H01H 15/04 29/622 |
| 2014/0337791 A1 | 11/2014 | Agnetta et al. |
| 2016/0255278 A1 | 9/2016 | Short |
| 2017/0127017 A1 | 5/2017 | Takahashi et al. |
| 2017/0302833 A1 | 10/2017 | Short et al. |
| 2018/0154514 A1 | 6/2018 | Angle et al. |
| 2019/0246063 A1 | 8/2019 | Karadayi |
| 2020/0260049 A1 | 8/2020 | Erna |
| 2020/0358910 A1 | 11/2020 | Nelson et al. |
| 2021/0006730 A1* | 1/2021 | Solomon .................. G06F 1/166 |
| 2021/0133220 A1* | 5/2021 | Sakai ...................... G06F 16/29 |
| 2021/0405865 A1 | 12/2021 | Faulkner |

OTHER PUBLICATIONS

Office Action for U.S. Appl. No. 17/838,529, dated Jan. 20, 2023, Rahul Gupta, "Audiovisual Device", 15 pages.
Office Action for U.S. Appl. No. 17/838,529, dated May 19, 2023, Rahul Gupta, "Audiovisual Device", 17 pages.
PCT International Preliminary Report on Patentability dated Sep. 28, 2023 for PCT Application No. PCT/US22/18148, 8 pgs.

\* cited by examiner

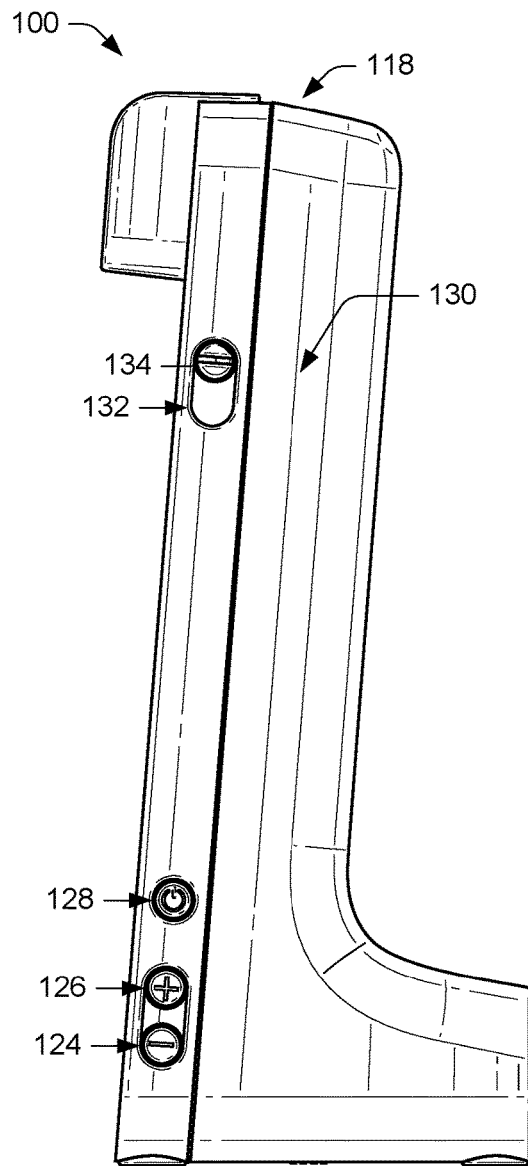
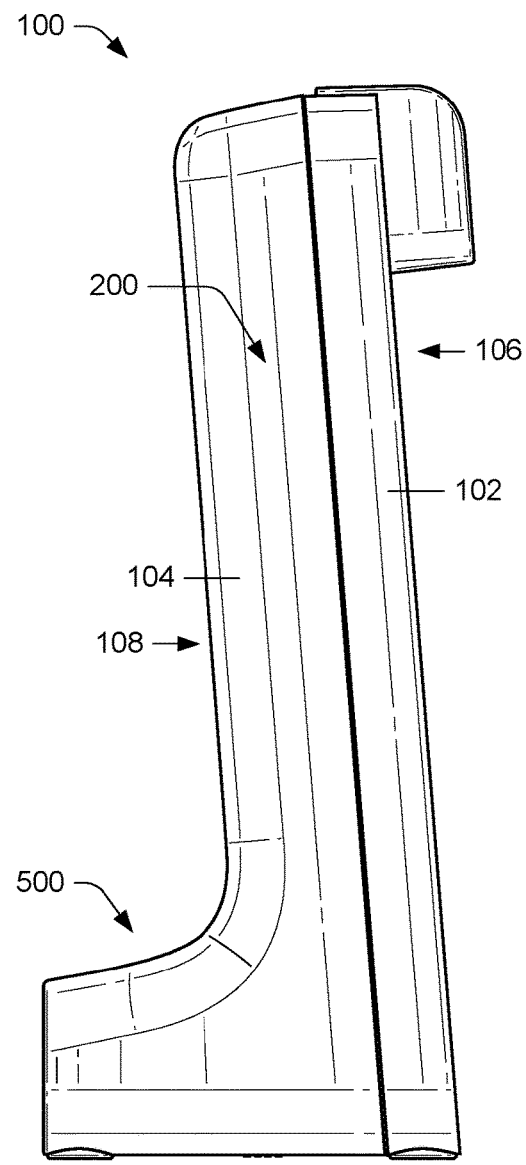
FIG. 5A
FIG. 5B

ELECTRONIC DEVICE WITH SHUTTER ASSEMBLY

BACKGROUND

Users are becoming more connected with the proliferation of computing devices, such as desktop and laptop computers, tablets, entertainment systems, and portable communication devices. As these computing devices continue to evolve, many different ways have been introduced to allow users to interact with the computing devices, such as through touch, gestures, and speech.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

FIG. 5A illustrates a planar view of a first side of the electronic device of FIG. 1, according to an embodiment of the present disclosure.

FIG. 5B illustrates a planar view of a second side of the electronic device of FIG. 1, according to an embodiment of the present disclosure.

DETAILED DESCRIPTION

Figure 1:
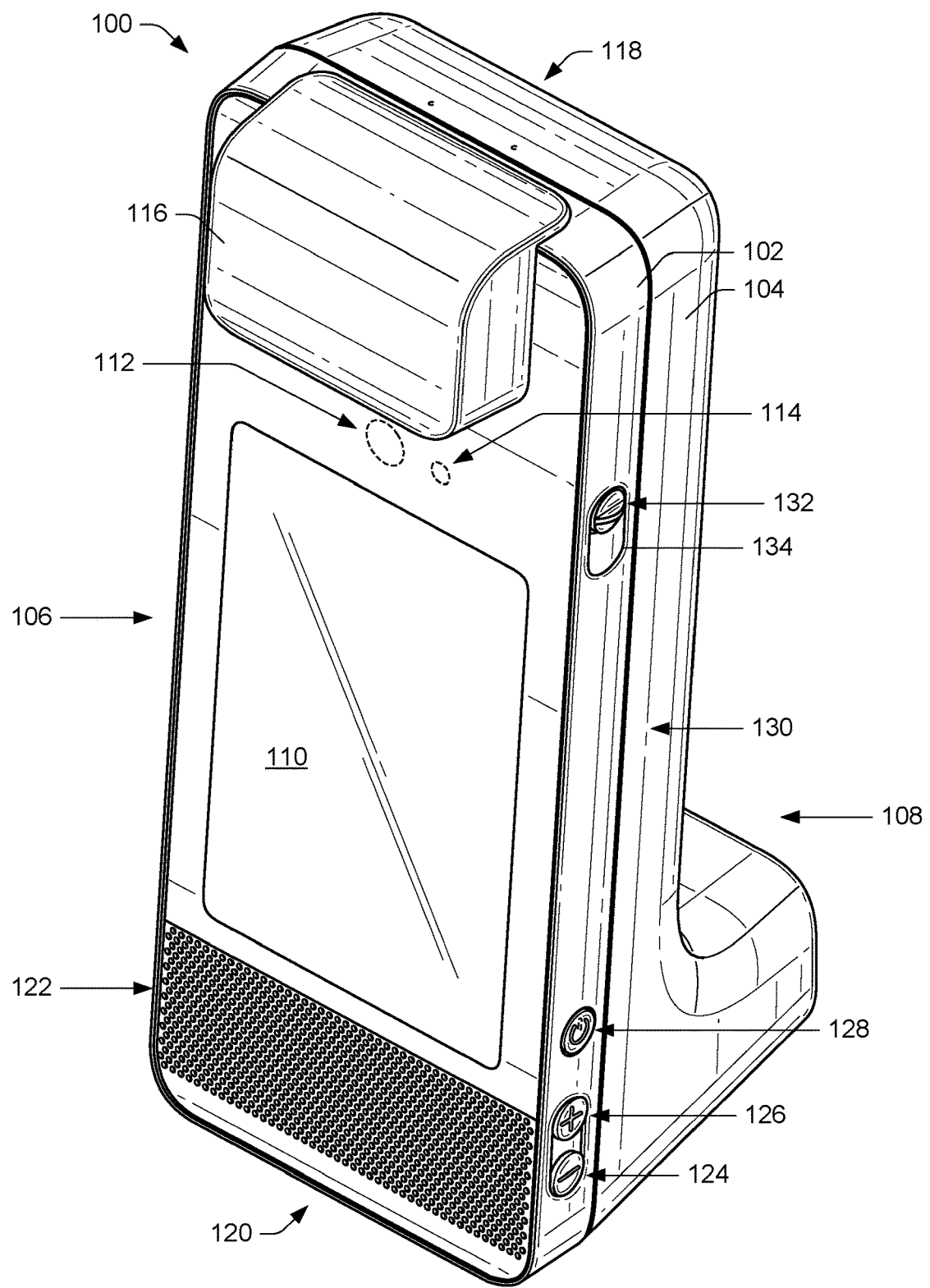
FIG. 1 illustrates a front perspective view of an example electronic device, according to an embodiment of the present disclosure. In some instances, the electronic device may include components for providing an immersive and interactive experience between one or more remote users. For example, the electronic device may include one or more display(s), loudspeaker(s), and/or projector(s) for presenting content, as well as one or more camera(s), microphone(s), button(s), and/or sensor(s) for capturing inputs. In some instances, the electronic device may include a front housing and a rear housing that couple together to form the electronic device.

This disclosure describes an electronic device that provides an immersive and interactive experience between users. The electronic device may communicatively couple to one or more remote electronic devices for sending and receiving information that enables interactivity between the users.

For example, a first user (e.g., a child, device user, patient, student, etc.) may interact with the electronic device at a first location and a second user (e.g., a caregiver, physician, teacher, etc.) may interact with a remote electronic device at a second location. In some instances, the first user and the second user may digitally interact with one another through a shared virtual space including content projected by the electronic device and displayed by the remote electronic device. The remote electronic device may include a projector for displaying the shared space or may include other interfaces through which the second user may interact with the first user (e.g., touch screen). For example, envision that the first user and the second user wish to draw a picture. In such instances, the first user may draw on a physical piece of paper placed within the shared space. Content drawn by the first user may be captured via a camera and sent to the remote electronic device. Additionally, content drawn by the second user may be received by the electronic device and projected onto the piece of paper.

The electronic device, as well as the remote electronic device, may include sensors for detecting a location of inputs made by the users, respectively. The inputs, for example, may be updates to the drawing. In turn, the electronic device may project interactions made by the second user and display the updated drawing for further interaction amongst the first user and the second user. The electronic device and the remote computing device also enable video and audio to be exchanged, for example, to enable additional interactivity. The electronic device may provide new forms of audiovisual interaction to increase user experiences.

In some instances, the electronic device may be formed at least in part by a first housing and a second housing. The first housing and the second housing may provide a body of the electronic device, and components of the electronic device may reside within the first housing and/or the second housing. Generally, the first housing and the second housing may form a rectangular-shaped body and the electronic device includes a base that positions the electronic device upright on a surface (e.g., countertop) of an environment in which the electronic device resides.

The electronic device may include display(s), projector(s), camera(s) (imaging devices), microphone(s), and/or loudspeaker(s) for providing an immersive experience between the first user and the second user. In some instances, the display may be located on a front of the electronic device and orientated in a direction for viewing by the first user. The content presented on the display may be captured by and received from the remote electronic device. For example, the remote electronic device may include a camera that captures images and/or video of the second user. The images and/or video are output on the display for viewing by the first user. This enables the first user and the second user interact with one another and visual observed feedback. In some instances, the display may be implemented as a high-resolution display, an e-ink display, a tactile electronic display (e.g., refreshable Braille displays), a segment display, a light-emitting diode (LED) display, a liquid crystal display (LCDs), a laser display, a holographic display, and the like. Additionally, in some instances, the display may be touch sensitive and capable sensing touch input from the first user.

The electronic device may include multiple cameras for capturing images and/or video associated with the first user. In some instances, a first camera may be disposed on the front of the electronic device to capture images (still and/or video) of the first user. For example, the first camera may be frontward facing to capture images and/or video in front of the electronic device. The images and/or video captured by the first camera may be transmitted to the remote electronic device for output and viewing by the second user. For example, the remote electronic device may include a display for outputting images and/or video of the first user. Additionally, noted above, as the electronic device projects content within the shared space, the electronic device may include a second camera oriented to capture content within the shared space. For example, the second camera may be oriented towards the surface on which the electronic device rests. That is, the second camera may orient downward, from a top of the electronic device, for capturing images and/or video within the shared space. In some instances, the second camera may be oriented substantially perpendicular or orthogonal to the surface. As such, the second camera may be configured to capture images and/or videos of the first user's interaction within the shared space for capturing and transmission to the remote electronic device for output.

The electronic device includes microphone(s) for capturing audio (e.g., speech) of the first user. The captured audio may be transmitted to the remote electronic device for output. In some instances, the microphones may be located at the top of the electronic device, distant from loudspeakers of the electronic device to limit interferences, echo, and noise. In some instances, audio captured by the microphones may be used for speech processing and/or cancelling background noise (e.g., air conditioner, television, etc.). The microphones may include an number of microphones, such as one, two, three, four, etc. Additionally, the microphones maybe arranged in patterns (e.g., circular, diamond, square, etc.) for improved audio processing and characteristics.

The loudspeaker(s) may output audio by the electronic device. For example, the remote electronic device may include microphones for capturing speech of the second user. In some instances, the loudspeaker(s) may include tweeter loudspeaker(s), mid-range loudspeaker(s), and/or subwoofer loudspeaker(s). In some instances, the loudspeaker(s) may be located proximal to the bottom of the electronic device. Locating the loudspeakers proximal to the bottom may lower a center of mass of the electronic device and increase a stability of the electronic device within environments. In some instances, the loudspeaker(s) may be oriented to output audio towards the front of the electronic device. The electronic device, such as the first housing, may include orifices through which audio output by the loudspeaker may pass for emitting sound outward and away from the electronic device.

As noted above, the electronic device further includes the projector for presenting content. The projector may include an associated projection area located in front of the electronic device. The projection area may represent the shared area within which the first user and the second user may virtually (e.g., digitally) interact. For example, the projector may project content onto the surface on which the electronic device resides (e.g., countertop). Within the projection area, the first user may provide inputs, such as moving his or her finger, drawing on a piece of paper, etc. These inputs may be captured by camera(s) and/or sensor(s) of the electronic device and transmitted to the remote electronic device for output.

To sense inputs from the first user, the electronic device includes an emitter (e.g. a laser, infrared (IR), etc.), that emits a plane of light in front of the electronic device. The plane of light is invisible to the first user and may run parallel to the surface on which the electronic device resides. In some instance, the plane of light may be disposed vertically above the surface, such as approximately between 1 millimeter (mm) and 5 mm. As the first user interacts within the shared area, fingers of the first user pass through certain areas of the plane of light. As this happens, a sensor may detect scattering of the light (as emitted by the emitter) to determine a position of the first user's interaction. These inputs are captured by the electronic device and paired with the images and/or video captured by the second camera. The electronic device may then transmit these interactions, as well as the images and/or video, to the remote electronic device for output and viewing by the second user. Locating the plane of light proximal to the surface on which the electronic device resides provides a haptic feedback to the first user as the first user interacts within the shared space. However, the first user may interact with implements (e.g., pencils) that scatter light and which are sensed by the sensor.

The electronic device may output, via the projector, inputs associated with the second user and images and/or video captured by the remote electronic device. As the first user and/or the second user interact within the shared space, the electronic device and the remote electronic device may output the content. By way of illustration, and continuing with the example introduced above, the first user and the second user may engage with the electronic device and the remote electronic device, respectively, to draw a picture of a flower. The first user, for example, may place a piece of paper within the shared space and draw a stem of the flower using a writing implement (e.g., pencil). This drawing may be sensed by the electronic device, and in response, the electronic device may transmit image data (or information) associated with the stem for display by or on the remote electronic device. For example, the remote electronic device may include a display, a touch-sensitive interface, and/or a projector that displays the stem. The second user may similarly interact within a shared space displayed by the remote electronic device. For example, the second user may draw pedals that extend from the stem. The electronic device may receive data associated with the input of the second user and project the pedals onto the stem drawn by the first user. The first user and the second user may therein provide additional inputs, such as drawing a ground surface, clouds, coloring in the pedals, and so forth. As such, the electronic device and the remote electronic device may communicatively couple to one another for presenting, in real-time, content to the first user and the second user, respectively. In such instances, the content projected may be up to date to display additions, alterations, and so forth made to the drawing by the first user and the second user. Additionally, during this interaction, the display may output video of the second user (i.e., as captured by a camera of the remote electronic device) and/or the loudspeaker(s) may output audio of the second user (i.e., as captured by microphone(s) of the remote electronic device). The camera and the microphones of the electronic device may respectively capture video and audio for output on the remote electronic device.

Although the discussion above relates to a particular interaction between the first user and the second user, the electronic device may facilitate additional interactions. For example, the electronic device may project a racetrack as drawn by the second user, and the first user may move a racecar around the racetrack. As the first user maneuvers the racecar, the second user may observe the first user maneuvering the racecar around the racetrack (i.e., via image data captured by the second camera and data captured by the sensor). As an additional example, the first user and the second user may interact to solve a math problem. For example, the first user may be working on homework, where the homework may be situated within the shared space of the electronic device. Here, the second camera may capture images of the homework for output and display on the remote electronic device. The second user may provide assistance to the first user by interacting with the remote electronic device. For example, the second user may highlight or otherwise point to a subtraction error made by the first user. As another example, the first user and the second user may be reading together. The first user may place the book (or other reading material) within the shared space such that the second user is able to visually see the book. The first user may use his or her finger to scroll across text of the book, as he or she reads. This movement may be output for the second user such that the second user may follow along as the first user reads. This allows the second user to correct errors or mispronunciations of the first user, for example. As such, the electronic device may provide improved immersive experiences between remote users, such as a caregiver and a patient, a teacher and a student, a parent and a child, a coach and an athlete, and so forth. As such, the electronic device may be utilized throughout a plurality of environments for facilitating interactivity between a plurality of users.

In some instances, the electronic device may include one or more buttons. The one or more buttons may be located along a side of the electronic device, and may include a power button, volume buttons, sync buttons, or any other type of button or control. The buttons may be mechanical (e.g., having physically movable components) and/or electronic (e.g., capacitive sensors, optical sensors, resistive sensors, or the like).

The electronic device may also include heat dissipating elements to dissipate heat generated by one or more components of the electronic device, such as the camera(s), the projector, the display, etc. The heat dissipating elements may include heat syncs coupled to the components. Additionally, the electronic device may include a fan that circulates air throughout an interior of the electronic device. In some instances, the fan may intake air through an inlet, circulate the air across heat generating components of the electronic device, and vent the air through an outlet. The fan, and the heat dissipating elements, may prevent the electronic device from overheating during use. In some instances, the inlet and the outlet may be located on the rear of the electronic device and space apart from one another to prevent the outlet air being taken in through the inlet.

In some instances, a shutter or other mechanism may be slid over the cameras of the electronic device to obstruct the cameras and/or provide privacy to the first user. The shutter may be actuated, for example, when the electronic device is not in use. In some instances, the shutter may include components to obstruct both the first camera and the second camera. As such, a single shutter may be utilized for obstructing the first camera that is frontward facing and the second camera that is downward facing. Covers of the shutter assembly may respectively cover the first camera and the second camera. Additionally, a switch may be activated/deactivated upon actuation of the shutter assembly to disable/enable the first camera and the second camera, respectively. This may include powering on or powering off the first camera and the second camera, enabling or disabling a functionality of the first camera and the second camera, and so forth.

The electronic device includes components for communicatively coupling with the remote electronic device, other devices, servers, etc. For example, although the above discussion is with regard to the electronic device communicatively coupling to a single remote electronic device, the electronic device may connect to any number of electronic device for providing the immersive experience (e.g., three, four, etc.). In such instances, any number of users may interact within the shared area. Moreover, in some instances, the remote electronic device may represent any type of electronic device, such as another of the electronic device, a laptop, a mobile device, a tablet, and so forth. In such instances, the remote electronic device may include components for capturing audio and/or visual content of the second user. In some instances, the remote electronic device may not include a projector for projecting the shared area, but rather, may present the shared area on a touch-sensitive interface of the remote electronic device. In such instances, the second user may interact with the touch-sensitive interface for digitally interacting with the first user.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a front perspective view of an electronic device 100. As shown, the electronic device 100 may include a generally-rectangular shaped body that sits upright on a surface (e.g., countertop, table, floor, etc.). In some instances, the electronic device 100 may be formed at least in part by a first housing 102 and a second housing 104. Collectively, the first housing 102 and the second housing 104 may couple together to form a housing, or body, of the electronic device 100. In some instances, the first housing 102 and the second housing 104 may couple together using fasteners, adhesives, snap-fit, etc. The first housing 102 may be located at a front 106 of the electronic device 100, whereas the second housing 104 may be located at a back 108 of the electronic device 100.

The electronic device 100 may represent an audiovisual device configured to output content (i.e., audio, images, video, etc.) within an environment of the electronic device 100. For example, the electronic device 100 is shown including a display 110 located at the front 106 (or front surface) of the electronic device 100. The first housing 102 may include an opening for accommodating the display 110. The display 110 may to present content to user(s) (e.g., images, video, etc.) and may include any suitable display, such as a liquid crystal displays (LCD), plasma, organic light emitting diode (OLED), etc. As shown in FIG. 1, the display 110 may be rectangular shaped which, in some instances, may be an eight inch display. However, other shaped displays are envisioned (e.g., circular, square, etc.). Additionally, in some instances, the display 110 may be touch sensitive and capable of receiving touch input (e.g., pressing, touching, swiping, etc.).

The electronic device 100 may be utilized by a first user (e.g., caregiver) for interacting with a second user (e.g., child) operating an additional device (e.g., mobile phone, laptop, tablet, etc.) located remotely from the environment. In such instances, the display 110 of the electronic device 100 may present the images and video of the second user. For example, the additional device of the second user may capture images and/or video for transmission to the electronic device 100 and output on the display 110. To capture images and/or videos of the first user, the front 106 of the electronic device 100 may include a first camera 112. The first camera 112 may be disposed vertically above the display 110 (Y-direction) for capturing images and/or video of the first user. For example, the first camera 112 may be oriented to capture images and/or videos in front of the electronic device 100. In some instances, the first camera 112 may include a wide-angle camera. The images and/or video captured by electronic device 100 may be output on the additional device of the second user. For example, the first camera 112 may capture images and/or video of the first user and transmit the images and/or video to the additional device for output and viewing by the second user.

The ambient light sensor 114 may sense an ambient light within the environment, for adjusting a brightness of the display 110. For example, the ambient light sensor 114 may include a photodetector that senses an amount of ambient light present. Based on the amount of ambient light, the electronic device 100 may appropriately dim the display 110. In some instances, the ambient light sensor 114 may be positioned adjacent to the first camera 112, above the display 110.

As discussed herein, the electronic device 100 may include a projector for presenting content to the first user. The projected content may be displayed in front of the electronic device 100 (Z-direction). In some instances, the projected content may be presented within a shared space located in front of the electronic device 100. Within the shared space, the first user may interact with the second user. For example, the projector may present content onto the surface on which the electronic device 100 resides, and the first user may interact with the content. These interactions may be captured and presented to the second user. Similarly, as the second user interacts with the content displayed on the additional device of the second user, these interactions may be output by the projector for viewing by the first user.

The electronic device 100 includes a projector housing 116 that houses the projector. As shown, the projector housing 116 may be located proximal to a top 118 of the electronic device 100, above the display 110. In some instances, the projector housing 116 may be integral with, or represent a component of, the first housing 102. The projector housing 116 is shown being disposed over the front 106 of the electronic device 100, or in front of the display 110 (Z-direction). The projector housing 116 may additionally couple to the second housing 104. As such, the projector housing 116 may protrude over the front 106 of the electronic device 100. The projector housing 116 may also offset the projector from a front surface of the electronic device 100. In some instances, the projector housing 116 may orient the projector downwards, towards a bottom 120 of the electronic device 100 or towards the surface on which the electronic device 100 rests (or downward from the top 118 of the electronic device 100). In doing so, the projector may project content in front of the electronic device 100, within the shared space.

The projector housing 116 may house other components of the electronic device 100, such as a second camera and/or a sensor. Both of these components are discussed in detail herein. However, generally, the second camera may sense content of the first user within the shared space, and transmit data associated with the content to the additional device of the second user. For example, if the first user places a piece of paper within the shared space, the second camera may capture image data of the piece of paper. The image data may then be sent by the electronic device 100 to the additional device for output. In some instances, a field of view of the second camera may correspond to a projection area of the projector, such that the electronic device 100 captures content shared by the first user within the shared space.

The sensor (e.g., laser sensor or IR sensor) may detect interactions of the first user within the shared space. The sensor may be configured to sense reflections as emitted from an emitter (e.g., laser, IR, etc.) of the electronic device 100. For example, proximal to the bottom 120 of the electronic device 100, the electronic device 100 may include an emitter that emits a plane of light in front of the electronic device 100. In some instances, the emitter may be located behind the front surface (Z-direction), within the electronic device 100. In such instances, the front surface of the electronic device 100 may include a transparent or semi-transparent material such that the light emitted by the emitter may pass therethrough. The emitter may emit the plane of light and the plane of light may run parallel to the surface on which the electronic device 100 resides. In some instance, the plane of light may be disposed vertically above the surface, such as approximately between 1 mm and 5 mm. As the first user interacts within the shared area, fingers (or other implements used by the first user) of the first user pass through certain areas of the plane of light. As this happens, the sensor may detect scattering of the light to determine a position of the interactions. The position may indicate a location of the interaction within the shared space, thereby knowing which portions of the content (as presented by the projector) the first user is interacting with. Discussed herein, the electronic device 100 may then transmit these interactions, as well as the images and/or video captured by the electronic device 100, to the additional device for output and viewing by the second user.

The first housing 102 may include orifices 122 that disperse sound generated by loudspeaker(s) of the electronic device 100. The orifices 122 may be disposed adjacent to one or more loudspeaker(s) located within an interior of the electronic device 100. For example, the loudspeaker(s) may reside beneath the first housing 102 (Z-direction). The orifices 122 permit sound generated by the loudspeaker(s) to pass from the interior of the electronic device 100 to an exterior of the electronic device 100. As shown, the orifices 122 may be located vertically below the display 110 (Y-direction), proximate to the bottom 120 of the electronic device 100.

The electronic device 100 may include one or more buttons located along one or more sides. For example, the electronic device 100 may include a first button 124, a second button 126, and/or a third button 128 located along a first side 130 of the electronic device 100. In some instances, the first button 124 and the second button 126 may correspond to a volume buttons, such as volume up and volume down. The third button 128 may correspond to a power button. In some instances, the first button 124, the second button 126, and/or the third button 128 may be mechanical buttons or electrical buttons (e.g., capacitive switch, etc.). Additionally, the first button 124, the second button 126, and/or the third button 128 may have symbols that visually indicate their associated function (e.g., "+" for volume up). While the electronic device 100 is shown including three buttons, the electronic device 100 may include more than or less than three buttons. Additionally, or alternatively, the first button 124, the second button 126, and/or the third button 128 may be located elsewhere on the electronic device 100, such as on the top 118.

The first side 130 is further shown including a knob 132, or protrusion, that protrudes from the interior of the electronic device 100. The knob 132 may represent a component of a shutter assembly of the electronic device 100. The knob 132 may be actuatable to cause components of the shutter assembly to cover (i.e., obstruct, block, impede, etc.) the first camera 112 and/or provide privacy. Similarly, the knob 132 may be actuatable to cause components of the shutter assembly to uncover (i.e., unobstructed, unblocked, unimpeded, etc.) the first camera 112, such as when the electronic device 100 is in use. Additionally, the knob 132 may be actuatable to cover and uncover additional camera(s) of the electronic device 100, such as the second camera disposed within the projector housing 116.

The knob 132 is moveable between a first position and a second position within a channel 134 formed by the first housing 102. At the first position, such as that shown in FIG. 1, shutter assembly may not obstruct the first camera 112 (and/or additional camera(s)). In a second position, the knob 132 may be actuated downward (i.e., Y-direction) to cause the shutter assembly to obstruct the first camera 112 (and/or the additional camera(s)).

In some instances, the electronic device 100 may include a light indicator that indicates an operational status of the electronic device 100, such as whether the electronic device 100 is projecting content, receiving audio, capturing images and/or video, and so forth. The light indicator may be illuminated statically (e.g., one or more of the light sources illuminated continuously) or dynamically (e.g., one or more of the light sources flashing simultaneously, illuminating one or more of the light sources sequentially, alternating which light sources are illuminated, etc.). Additionally, the light indicator may take a wide range of visual appearances by varying which light sources are on/off, the respective colors of the light sources, and the timing of activating the light sources. In some instances, the light indicator may be located along the front 106, the top 118, etc.

The electronic device 100, or components thereof, such as the first housing 102 and the second housing 104, may be manufactured from a plurality of materials including plastic, metal, composites, and/or combinations thereof. Additionally, the electronic device 100, or components thereof, may be manufactured using a plurality of manufacturing processes, such as injection molding, cast molding, blow molding, stamping, and/or a combination thereof.

Figure 2:
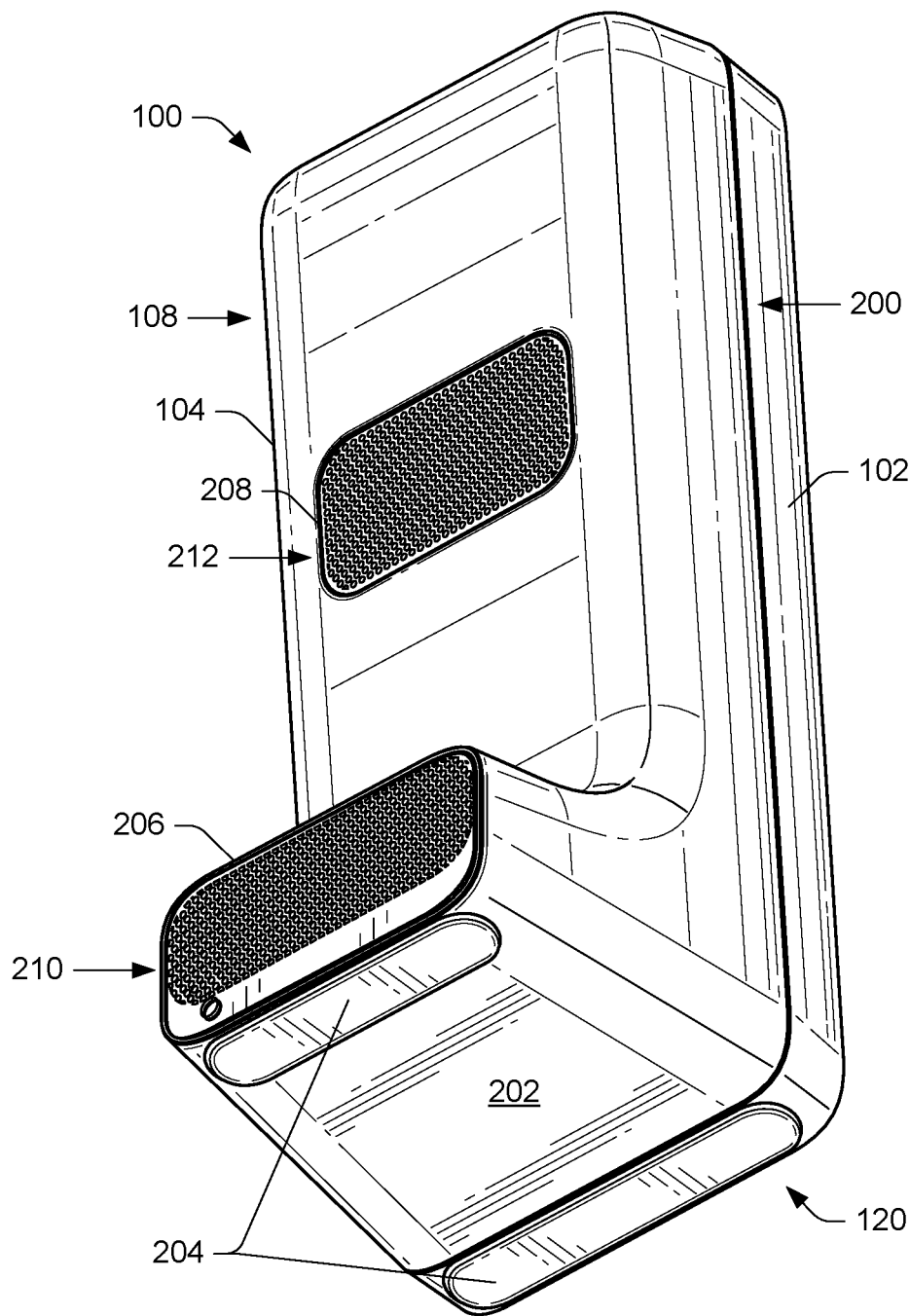
FIG. 2 illustrates a rear perspective view of the electronic device of FIG. 1, according to an embodiment of the present disclosure.

FIG. 2 illustrates a rear perspective view of the electronic device 100, showing the back 108, the bottom 120, and a second side 200 of the electronic device 100.

The electronic device 100 includes a base 202 located on the bottom 120. The base 202 may be formed at least in part by the first housing 102 and/or the second housing 104, and may support the electronic device 100 on a plurality of surfaces. In some instances, the base 202 may include one or more pads 204 made of rubber, for instance, that secure the electronic device 100 on a plurality of surfaces, such as on a desk, counter, shelf, etc. The pads 204 may also dampen and/or absorb vibrations of the electronic device 100 and/or may prevent the electronic device 100 from rattling during use (e.g., via audio output from the one or more loudspeaker(s)). In some instances, the base 202 may also include identifiers of the electronic device 100 (e.g., serial number) and/or other product information associated with the electronic device 100.

The electronic device 100 includes mechanisms for dispersing heat generated by components of the electronic device 100 (e.g., the first camera 112, the projector, etc.). For example, the electronic device 100 may circulate air within an interior of the electronic device 100 to dissipate generated heat. In some instances, the second housing 104 may include an inlet 206 through which air enters the electronic device 100 and an outlet 208 through which the air exits the electronic device 100. The inlet 206 may include first orifices 210 for allowing air to enter the electronic device 100. The outlet 208 may include second orifices 212 for allowing air to exit the electronic device 100.

A fan disposed within the electronic device 100 may draw the air through the inlet 206 and vent the heated air out the outlet 208. Between the inlet 206 and the outlet 208, the electronic device 100 may include passages (e.g., ducts, flues, channels, etc.) for routing the air across components of the electronic device 100. The electronic device 100 may also include additional heat dissipating elements, such as heat syncs, to assist in dissipating heat. The fan and the heat dissipating elements may prevent the electronic device 100 from overheating during use and may reduce a touch temperature of the electronic device 100.

As shown, the inlet 206 and the outlet 208 may be located distant from one another. For example, the inlet 206 may be located closer to the bottom 120 of the electronic device 100 than the outlet 208. Locating the inlet 206 and the outlet 208 distant from one another may avoid heated air being drawn by the fan into the inlet 206. In some instances, the outlet 208 may include a manifold for directing exhausted air way from the inlet 206.

Figure 3:
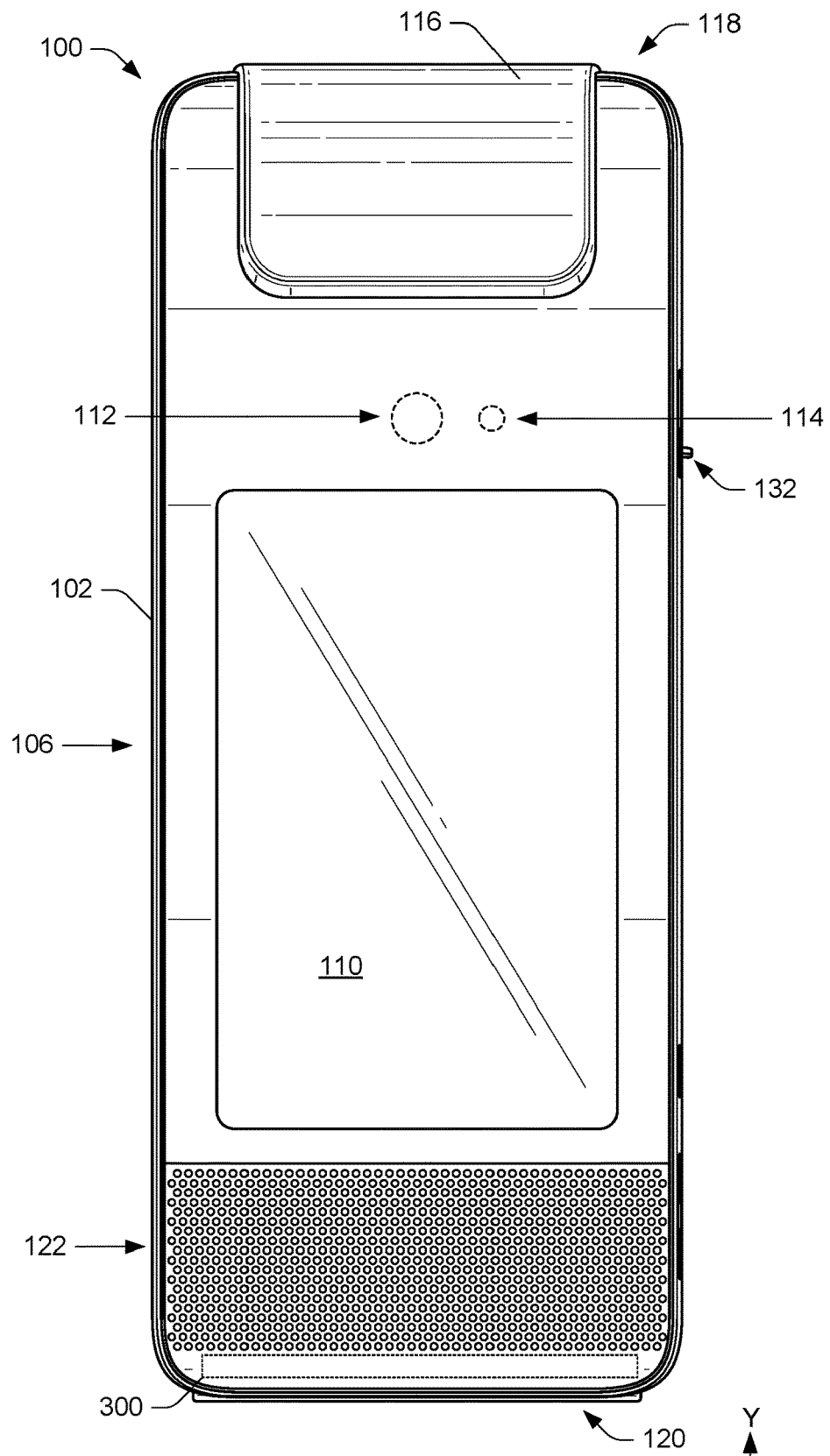
FIG. 3 illustrates a planar view of a front of the electronic device of FIG. 1, according to an embodiment of the present disclosure.

FIG. 3 illustrates the front 106 of the electronic device 100, showing the display 110, the first camera 112, and the ambient light sensor 114. The first housing 102 may include openings or features for accommodating the display 110, the first camera 112, and the ambient light sensor 114. For example, as the first camera and/or the ambient light sensor 114 may reside beneath a front surface of the electronic device (Z-direction), portion of the front surface (e.g., cover) may be transparent. Additionally, the first housing 102 includes the orifices 122 for dispersing sound generated by loudspeaker(s) of the electronic device 100, from within an interior of the electronic device 100 to an exterior of the electronic device 100. In some instances, the orifices 122 may be arranged in a generally rectangular pattern across a surface of the first housing 102. The knob 132 is also shown projecting outward from the first side 130 for easily grasping.

The electronic device 100 includes a transparent area 300 through which the emitter may emit light. The transparent area 300 is shown in dashed lines to represent a portion of the first housing 102 (or cover) through which the light passes. The transparent area 300 may be formed within the first housing 102, or in other words, the first housing 102 may include the transparent area for allowing light to be emitted from within the interior of the electronic device 100. In such instances, light emitted by the emitter may pass through the transparent area 300 so as to create a plane of light in front of the electronic device 100.

The projector housing 116 extends from the first housing 102, so as to be disposed over the front 106. The projector housing 116 may offset the projector from the front 106. In some instances, the projector housing 116 may include a width that is less than a width of the electronic device 100 (X-direction).

As shown, and in some instances, the display 110 may be disposed (Y-direction) between the first camera 112 and/or the ambient light sensor 114, and the orifices 122. In some instances, the first camera 112 and the ambient light sensor 114 may be located more proximal to the top 118, as compared to the display 110 and the orifices 122. Additionally, in some instances, the orifices 122 may be located more proximal to the bottom 120, as compared to the display 110, the first camera 112, and/or the ambient light sensor 114. The first camera 112 and the ambient light sensor 114 may also be located between the projector housing 116 and the display 110. Further, the transparent area 300 is shown being disposed between the orifices 122 and the bottom 120 of the electronic device 100.

Figure 4:
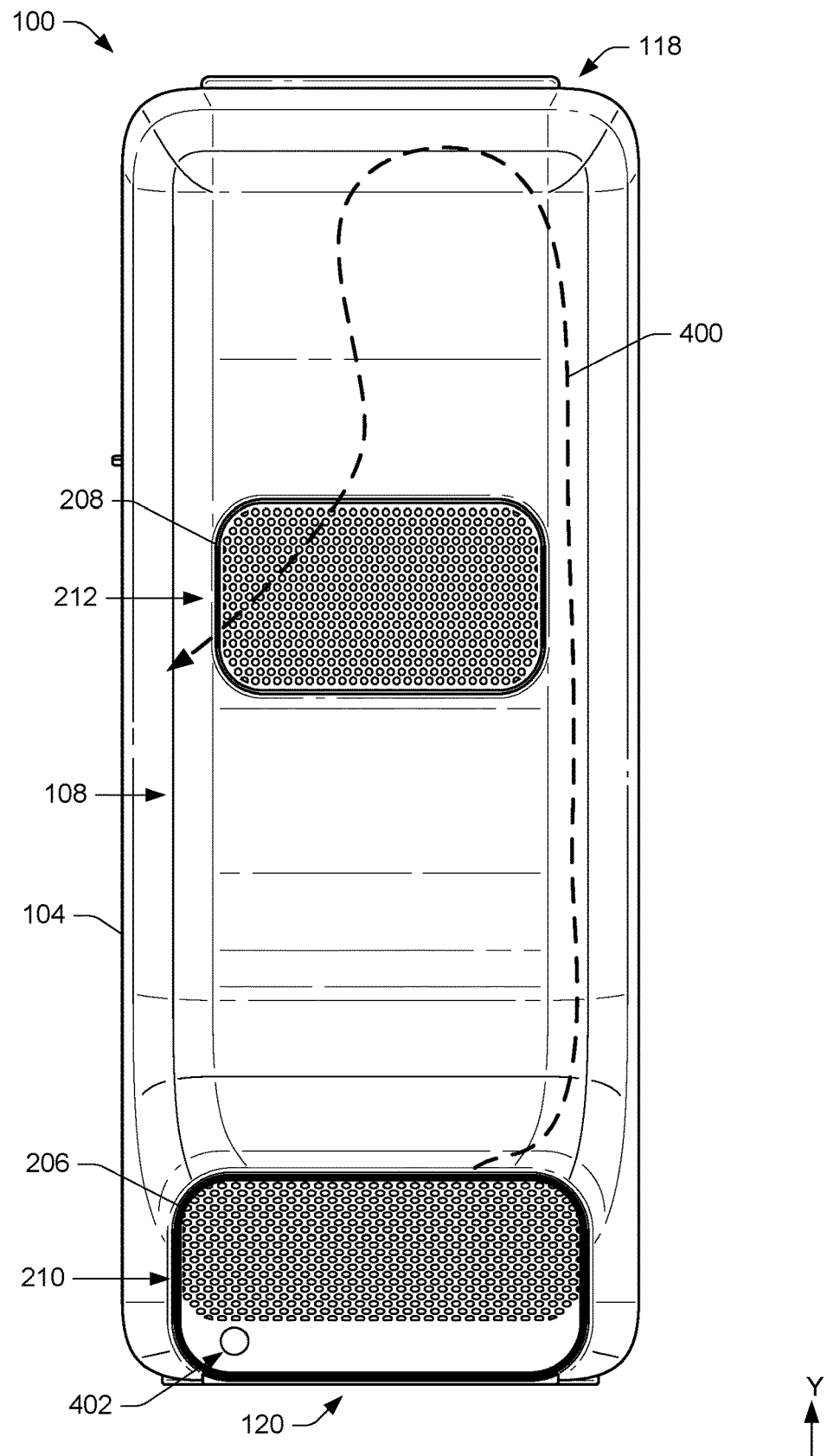
FIG. 4 illustrates a planar view of a rear of the electronic device of FIG. 1, according to an embodiment of the present disclosure.

FIG. 4 illustrates the back 108 of the electronic device 100, showing the inlet 206 and the outlet 208. As discussed above, the inlet 206 may be located more proximal to the bottom 120 as compared to the outlet 208. As such, the outlet 208 may be located more proximal to the top 118 as compared to the inlet 206. This arrangement of the inlet 206 and the outlet 208 may avoid heated air exiting the outlet 208 being taken in through the inlet 206. For example, heated air vented through the outlet 208 may rise in a direction away from the inlet 206 (i.e., Y-direction).

The inlet 206 and the outlet 208 may be formed via the first orifices 210 and the second orifices 212, respectively, extending through the second housing 104. The inlet 206 and the outlet 208 are shown including a generally rectangular shape, or stated alternatively, the first orifices 210 and the second orifices 212 may be arranged in a generally rectangular shape or pattern. Although the inlet 206 and the outlet 208 are shown being located at certain positions, the inlet 206 and the outlet 208 may be located elsewhere on the electronic device 100. Additionally, or alternatively, the inlet 206 and the outlet 208 (or the first orifices 210 and the second orifices 212) may take other shapes than shown (e.g., circular, hexagonal, etc.).

The circulation of the air within the electronic device 100 is shown through a flow path 400. For example, noted above, air may enter the inlet 206, travel upward (Y-direction), around/over components of the electronic device 100, and then exit the outlet 208. A fan disposed within the interior may direct the air through the electronic device 100 and out the outlet 208. In some instances, the flow path 400 may flow within the projector housing 116 for transferring heat generated by the projector, as well as additional components (e.g., second camera, printed circuit boards (PCBs), etc.)

The interior of the electronic device 100, the first housing 102, and/or the second housing 104 may include channels, manifolds, etc. for routing the air.

The back 108 is further shown including a receptacle 402 for receiving a power cord to power the electronic device 100. The receptacle 402 includes a socket or plug-in into which the power cord may couple to the electronic device 100.

FIGS. 5A and 5B illustrate side views of the electronic device 100. FIG. 5A illustrates the first side 130 of the electronic device 100, while FIG. 5B illustrates the second side 200 of the electronic device 100, opposite the first side 130.

The first side 130 is shown including the first button 124, the second button 126, the third button 128, and the knob 132. As discussed above, first button 124, the second button 126, the third button 128, and/or the knob 132 may be disposed through openings or channels of the first housing 102. For example, the first housing 102 may include the channel 134 through which the knob 132 protrudes. Introduced above, the knob 132 may slide within the channel 134, between the first position whereby the shutter assembly may not obstruct the first camera 112, and the second position, whereby the shutter assembly may obstruct the first camera 112. In the first position, the knob 132 may be extended to a top-most position within the channel 134, for example, and permit images and/or video to be captured. Alternatively, in the second position, the knob 132 may be extended to a bottom-most position within the channel 134 to restrict images and/or video to be captured. The knob 132 may be located proximal to the top 118 of the electronic device 100, adjacent to the first camera 112 of the electronic device 100.

In some instances, when the knob 132 is extended to the first position, a switch of the electronic device 100 may be activated to enable (e.g., power on, enable function, etc.) the first camera 112. Additionally, or alternatively, when the knob 132 is extended to the second position, a switch of the electronic device 100 may be activated to disable (e.g., power off, disable function, etc.) the first camera 112. Actuation of the knob 132 may also obstruct additional camera(s) of the electronic device 100, such as a second camera within the projector housing 116. As such, shutter assembly may simultaneously obstruct the first camera 112 and the second camera. Additional details of the shutter assembly are discussed herein.

As discussed above, the electronic device 100 may be formed by coupling the first housing 102 and the second housing 104 together. The second housing 104 is shown including a leg 500 that provides support to the electronic device 100. For example, the leg 500 may prevent the electronic device 100 tipping over. The leg 500 extends in a direction away from the front 106, or away from the first housing 102 (Z-direction). In some instances, the leg 500 may include the inlet 206 through which the fan draws air into the electronic device 100.

As shown, portions of the electronic device 100 may be angled backwards, from the front 106 to the back 108 (about the Y-axis). The angling may locate weight of the electronic device 100 relative to a central vertical axis of the electronic device 100. For example, the projector, the fan, and/or other components of the electronic device 100 may be located proximal to the top 118. The weight of these components may raise a center of mass of the electronic device 100. To counterbalance this weight, the display 110 and other portions of the electronic device 100 may be slanted backward. This may locate a center of mass and/or a center of gravity (CoG) above the base 202 for increasing a stability of the electronic device 100. In some instances, the display 110, or a front surface of the electronic device 100 may be angled backwards between five degrees and ten degrees, relative to a vertical axis of the electronic device 100 (Y-axis). As such, relative to the bottom 120 (or base 202), the display 110 or the front surface may be disposed at an acute angle.

Additionally, angling of the display 110 may orient the display 110 towards user(s) interacting with the electronic device 100. For example, orientating the display 110 upwards, from the surface on which the electronic device 100 rests, may serve to orthogonally orient the display 110 to the user(s). This may increase a viewing experience of the user(s). Additionally, the orientation may also angle the first camera 112 towards the users.

Figure 6:
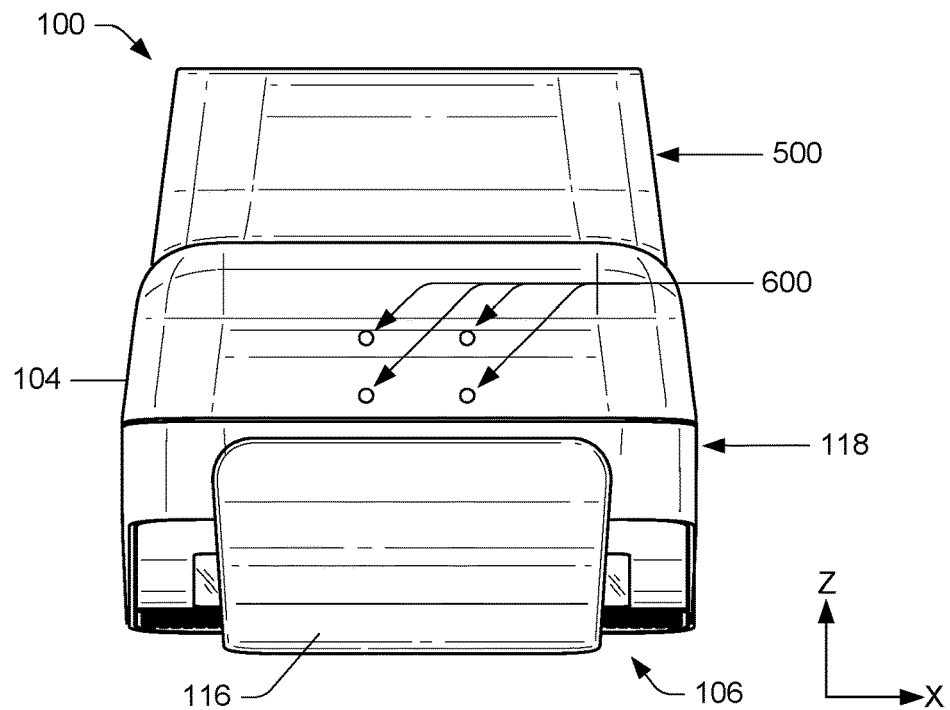
FIG. 6 illustrates a planar view of a top of the electronic device of FIG. 1, according to an embodiment of the present disclosure.

FIG. 6 illustrates the top 118 of the electronic device 100. The projector housing 116 is shown extending over the display 110, or a front surface of the electronic device 100. As such, the projector within the projector housing 116 may be offset from the front surface, in a direction outward, from the electronic device 100 (Z-direction).

The electronic device 100 may include microphones 600 located at the top 118. As shown, the microphones 600 may include four microphones 600 disposed on the top 118 (X-direction). The microphones 600 may be located along the top 118, distant from loudspeaker(s) of the electronic device 100 to limit interferences, echo, and noise. In some instances, audio captured by the microphones 600 may be used for acoustic echo cancellation (AEC) or active noise cancellation. In some instances, the microphones 600 (or microphone ports) may be disposed within the second housing 104. Although shown as including four microphones, the microphones 600 may include an number of microphones, such as two, five, etc. Additionally, the microphones 600 maybe arranged in patterns (e.g., circular, diamond, square, etc.). The microphones 600 may also be spaced apart from one another differently than illustrated in FIG. 6 (e.g., X and/or Z-directions). The microphones 600 may capture audio, which in some instances, may be transmitted to the additional electronic device for output.

The leg 500 is further shown extending backwards, in a direction away from the front 106, for increasing a stablishing of the electronic device 100. In some instances, a footprint of the bottom 120 may be greater than a footprint of the top 118 for increasing the stability of the electronic device 100.

Figure 7:
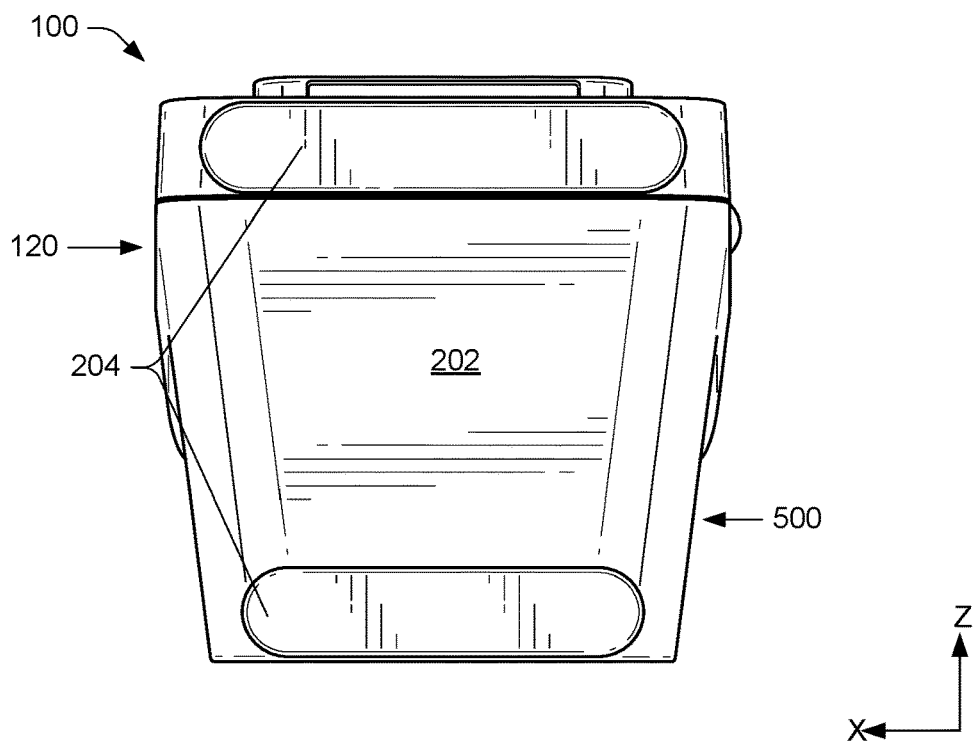
FIG. 7 illustrates a planar view of a bottom of the electronic device of FIG. 1, according to an embodiment of the present disclosure.

FIG. 7 illustrates the bottom 120 of the electronic device 100, showing the base 202 and the leg 500 of the second housing 104 for increasing a stability of the electronic device 100. The base 202 is further shown including the pads 204 for securing the electronic device 100 on various surfaces. In some instances, the pads 204 may be disposed on the first housing 102 and/or the second housing 104.

Figure 8:
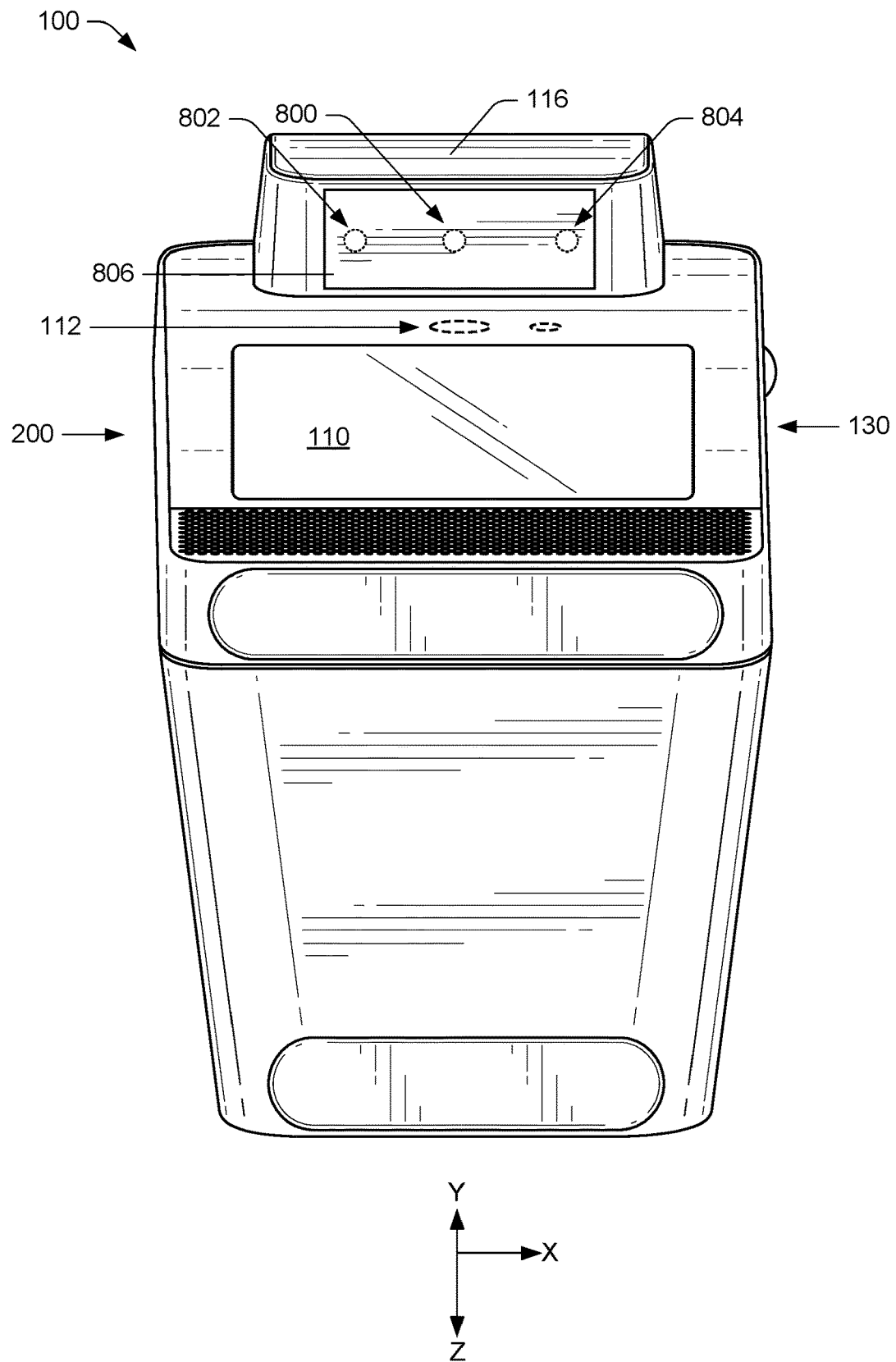
FIG. 8 illustrates a front perspective view of the electronic device of FIG. 1, according to an embodiment of the present disclosure.

FIG. 8 illustrates a bottom view of the projector housing 116, showing a projector 800, a second camera 802, and/or a sensor 804. The projector 800, the second camera 802, and the sensor 804 are shown in dashed lines to indicate their position behind (Y-direction) a pane 806. The dashed line representations of the projector 800, the second camera 802, and/or the sensor 804 are merely representative. The projector 800, the second camera 802, and/or the sensor 804 may include different shapes (e.g., square, hexagonal, etc.). In some instances, the pane 806 may prevent debris (e.g., dust) or other materials (e.g., food) entering the projector 800, the second camera 802, and the sensor 804 (or assemblies thereof).

As shown, the projector 800, the second camera 802, and the sensor 804 may be oriented downwards. In some instances, the projector 800 may be oriented orthogonal relation to a surface on which the electronic device 100 resides. That is, although the display 110 may be oriented or tilted backwards relative to the surface, the projector 800 may oriented perpendicularly to the surface. In some instances, the second camera 802 and/or the sensor 804 may be oriented outwards, or away from the front surface of the electronic device 10.

The projector 800 may project content within a shared space, which may represent an area in front of the electronic device 100. For example, the projected content may represent interactions made by user(s) interacting with an additional device, and which communicatively couples to the electronic device 100. As such, the projector 800 may project content on top of (e.g., overlaid) content within the shared space. The second camera 802 may capture images and/or videos within the shared space. For example, if the user of the electronic device 100 places a piece of homework within the shared space, the second camera 802 may capture images and/or videos of the piece of homework for transmission and output to the user(s) of additional device(s). The sensor 804 may detect interactions of users of the electronic device 100, within the shared space. The sensor 804 may be configured to sense reflections from light, as emitted from an emitter of the electronic device 100. That is, as noted above, the emitter (e.g., a laser) emits a plane of light in front of the electronic device 100 and as the user interacts within the shared space, the user (e.g., fingers, implement, objects) may pass through certain areas of the plane of light. As this happens, the sensor 804 may detect scattering of the light to determine a position of the interaction. These interactions, as well as the images and/or video captured by the electronic device 100, such as the second camera 802, may be sent to the additional device for output.

In some instances, the electronic device 100 may include one or more proximity sensor(s) within the projector housing 116. The proximity sensor(s) may be disposed in close proximity to the projector 800. The proximity sensor(s) may determine whether objects are within close proximity to the projector 800. For example, if a user places his or her face proximal to the projector 800 (e.g., looking vertically up into the projector housing 116), the proximity sensors may sense the face of the user. In response, the projector 800 may power off, be disabled, or reduce an intensity of emitted light. This may prevent damage or injury to the user. Alternatively, if no objects are detected in proximity to the projector 800, the intensity of the projector 800 may increase.

In some instances, the projector 800 may be vertically aligned with the first camera 112. That is, the projector 800 may be aligned with the first camera 112, or positioned along a central axis of the electronic device 100 (X-direction). In some instances, the second camera 802 may be disposed more proximate to the second side 200. Additionally, or alternatively, the sensor 804 may be disposed more proximate to the first side 130. However, although the projector 800, the second camera 802, and the sensor 804 are shown in a certain order or placement, the projector 800, the second camera 802, and the sensor 804 may be arranged differently. For example, the second camera 802 may be disposed behind (Z-direction) the projector 800.

In some instances, the first camera 112 and the second camera 802 may be integrated within a single camera. In such instances, the single camera may include a wide angle lens for capturing images and/or video of the user, as well as images and/or video within the shared space. In some instances, the single camera may reside on the front 106 of the electronic device 100.

Figure 9A:
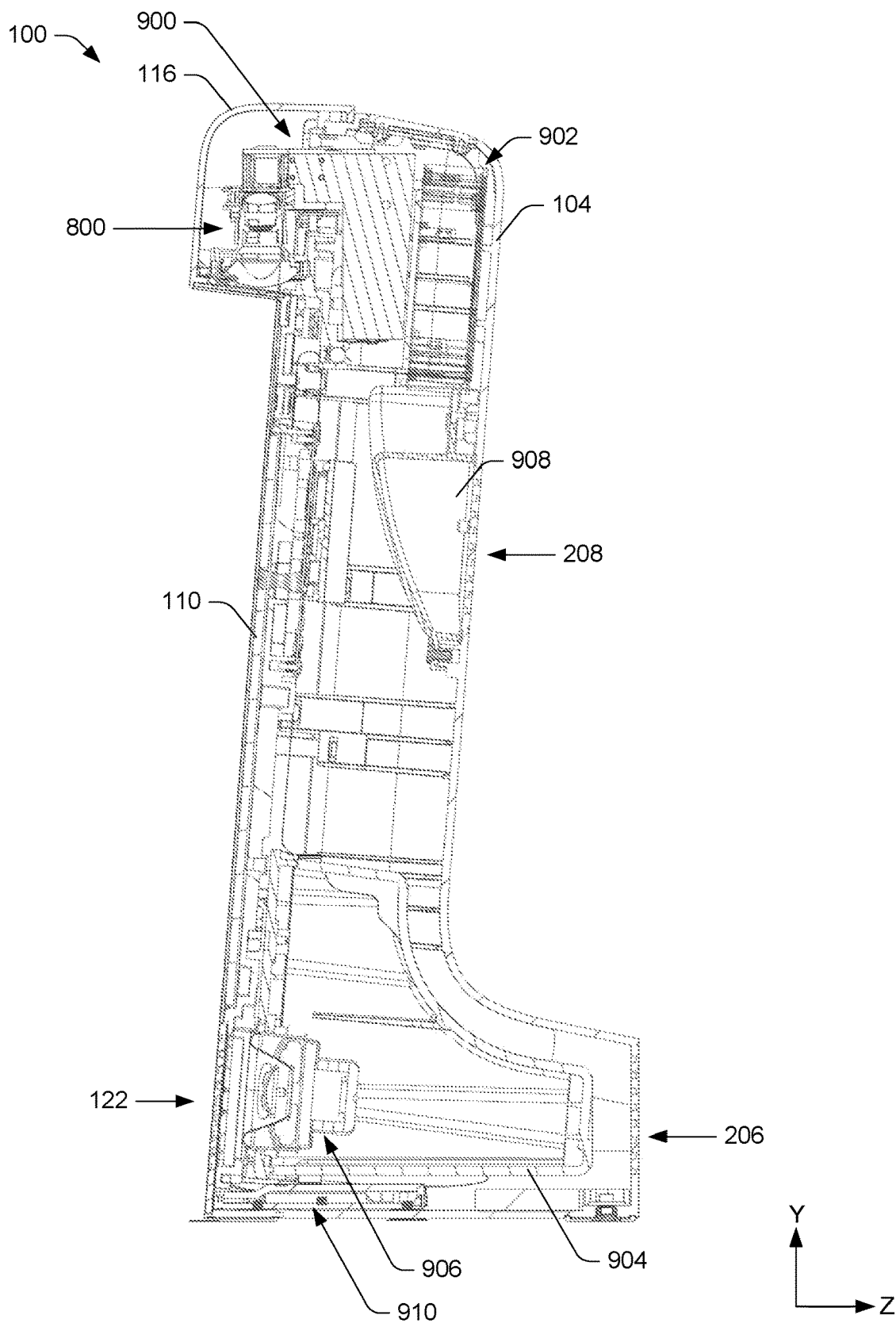
FIG. 9A illustrates a cross-sectional view of the electronic device of FIG. 1, according to an embodiment of the present disclosure.
Figure 9B:
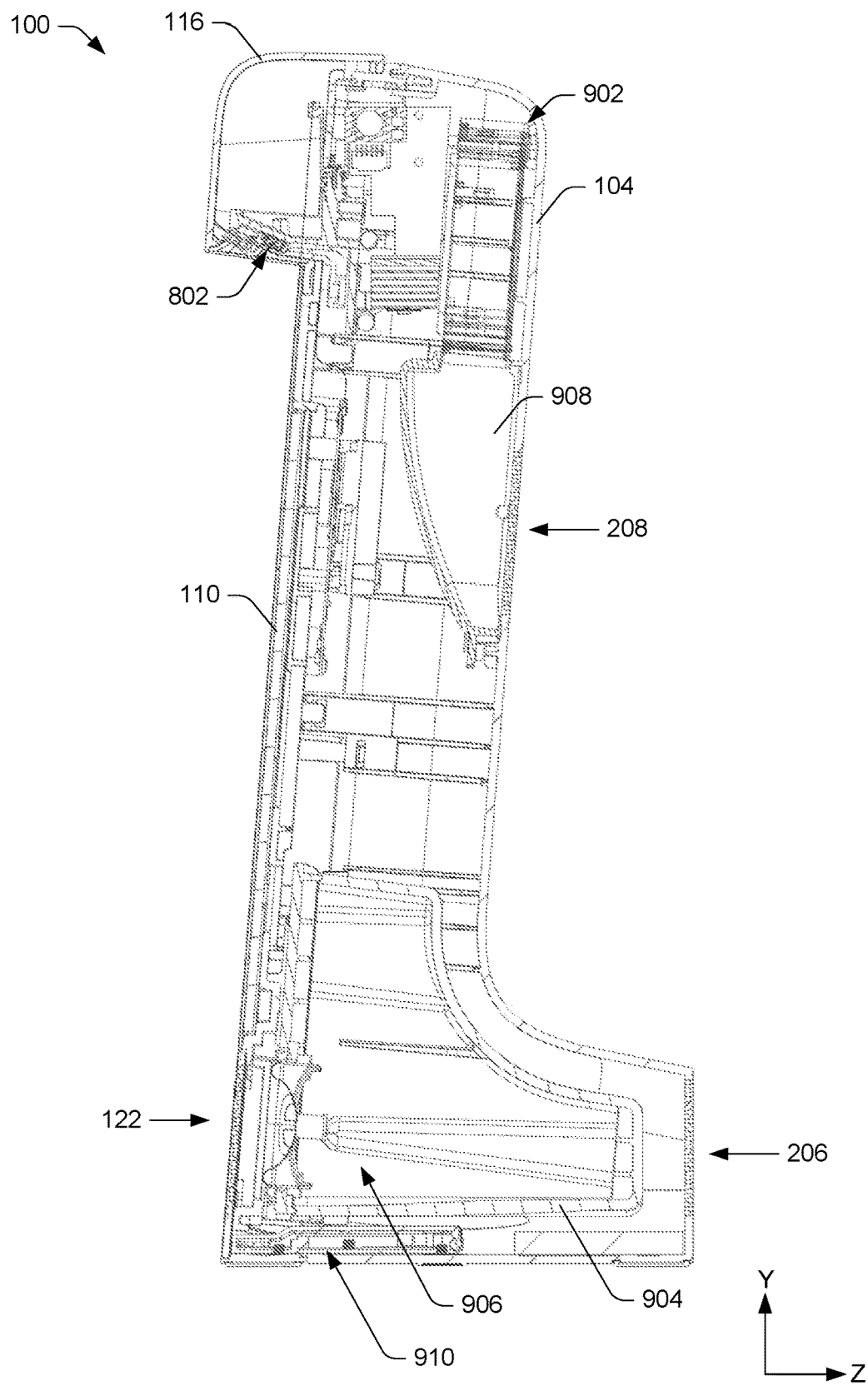
FIG. 9B illustrates a cross-sectional view of the electronic device of FIG. 1, according to an embodiment of the present disclosure.

FIGS. 9A and 9B illustrate cross-sectional views of the electronic device 100. Specifically, FIG. 9A illustrates a cross-sectional view of the electronic device 100 taken along a Y-Z plane that extends through the projector 800. FIG. 9B illustrates a cross-sectional view of the electronic device 100 taken along a Y-Z plane that extends through the second camera 802.

The projector 800 is shown residing within the projector housing 116 and oriented in a direction downwards. For example, whereas the display 110 may be oriented backwards, relative to a surface on which the electronic device 100 resides, the projector 800 may be oriented substantially orthogonal to the surface. In some instances, portions of the projector 800 may be blocked to limit projection of the projector 800 to in front of the electronic device 100. For example, a lens or other cover may be placed over a half, side, or surface of the projector 800 to limit projecting in a direction into the electronic device 100 (Z-direction). As such, the projector 800 may be oriented to present content in front of the electronic device 100. In some instances, a bracket or other frame may dispose and orient the projector 800 within the electronic device 100. The projector 800 may also be a component of a projector sub-assembly 900, which includes, among other things main logic boards (MLBs), PCBs, heat syncs, controllers, lenses, brackets, etc.

The second camera 802 is also shown residing within the projector housing 116. As shown in FIG. 9B the second camera 802 may be oriented away from the display 110, or away from the front 106 of the electronic device 100. That is, compared to the projector 800, the second camera 802 may be oriented at angles other than being orthogonal to the surface on which the electronic device 100 resides. In such instances, the second camera 802 may capture content within the shared space. Additionally, the second camera 802 may include an RGB camera.

In some instances, the electronic device 100 may include components for aligning the projector 800, the second camera 802, and/or the sensor 804 with the electronic device 100 (or within the projector housing 116). For example, screws may adjust field of views of the projector 800, the second camera 802, and/or the sensor 804, independently or collectively.

FIGS. 9A and 9B further illustrate a fan 902 of the electronic device 100. The fan 902 resides within an interior of the electronic device 100, such as within the second housing 104. The fan 902 is configured to draw air through the electronic device 100, from the inlet 206, and to the outlet 208. In some instances, the fan 902 may represent a centrifugal fan and may operate at variable speeds for achieving different flow rates (e.g., variable speed fan). For example, based on a sensed temperature of the projector 800, varying voltages may be applied to the fan 902 to regulate flow rates within the electronic device 100. As discussed above, the fan 902 may draw air across the display 110, the projector 800, the second camera 802, and additional components of the electronic device 100 (e.g., heat dissipating elements). In some instances, air drawn by the fan 902 may route around a loudspeaker housing 904 that houses a loudspeaker 906 of the electronic device 100. For example, air may be taken in through the inlet 206, routed between a surface of the loudspeaker housing 904 and a surface of the second housing 104, and up through the interior of the electronic device 100. As shown, the fan 902 may be disposed proximate the top 118 of the electronic device 100.

The fan 902 may couple to a manifold 908, which may help direct the air within electronic device 100 and/or out of the electronic device 100. For example, as shown, the manifold 908 may be disposed adjacent to (or fluidly coupled to) the outlet 208. An outlet end of the fan 902 may couple to the manifold 908. The loudspeaker housing 904 may also assist in directing air within electronic device 100.

The loudspeaker 906 is shown disposed proximal to the bottom 120 of the electronic device 100. The loudspeaker 906 is oriented to output sound in a direction towards the front 106 of the electronic device 100, through the orifices 122. The loudspeaker 906 may be at least partially received within the loudspeaker housing 904. The loudspeaker housing 904 may provide back volume to the loudspeaker 906 to enhance audio characteristics of the electronic device 100. For example, the loudspeaker housing 904 may include a chamber or cavity to provide back volume to the loudspeaker 906. The loudspeaker housing 904 may include a shape and size for residing within the leg 500 of the second housing 104, once the electronic device 100 is assembled. Additionally, foams or other gaskets may be disposed within and/or around the loudspeaker housing 904 and/or the loudspeaker 906 to prevent rattling or vibrations being imparted into the electronic device 100.

An emitter 910 resides within the electronic device 100, proximal to the bottom 120. As shown, the emitter 910 may reside beneath (Y-direction) the loudspeaker 906 and/or the loudspeaker housing 904. The emitter 910 is oriented and arranged to output light (e.g., laser, IR, etc.) out the front 106 of the electronic device 100. For example, as discussed above, light emitted by the emitter 910 may pass through the transparent area 300 of the first housing 102. In some instance, the plane of light may be disposed vertically above a surface on which the electronic device 100 resides, such as approximately between 1 mm and 5 mm above the surface.

Figure 10:
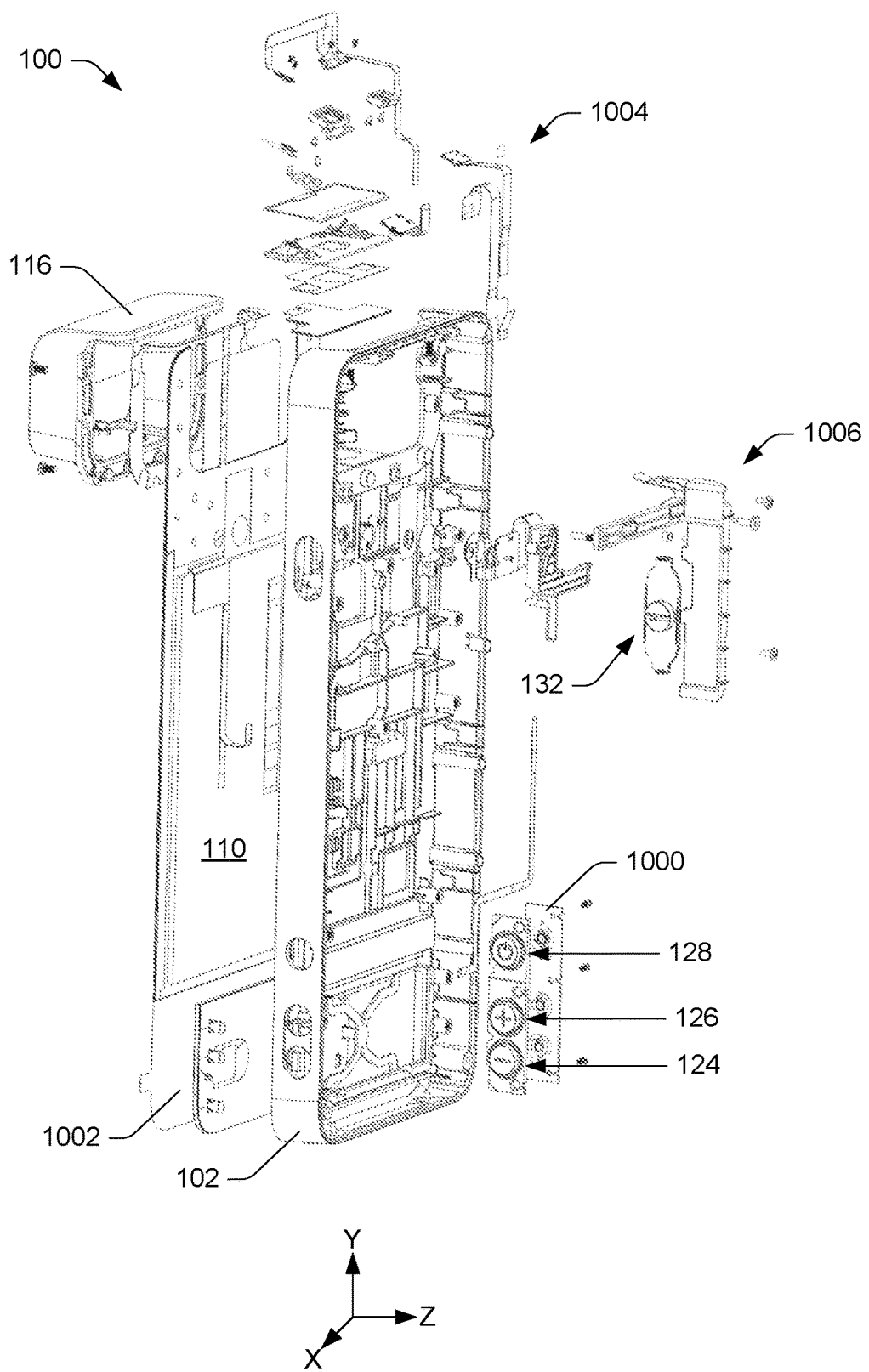
FIG. 10 illustrates a partial exploded view of the electronic device of FIG. 1, according to an embodiment of the present disclosure.

FIG. 10 illustrates a partially exploded view of the electronic device 100, showing the first housing 102, the projector housing 116, and the display 110. The projector housing 116 and the display 110 are configured to couple to the first housing 102. The projector housing 116 may, in some instances, additionally couple to the second housing 104. In some instances, the first housing 102 may include flanges, pins, or other mechanisms for aligning components within the first housing 102 and/or to otherwise assist in mounting components to and/or within the first housing 102.

The first housing 102 may include openings, ports, sockets, and so forth for receiving components of the electronic device 100. For example, the first housing 102 may include openings for receiving the display 110, the projector housing 116, the first button 124, the second button 126, the third button 128, and/or the knob 132. In such instances, the first button 124, the second button 126, the third button 128, and the knob 132 may be disposed at least partially through the openings in the first housing 102.

To permit operation of the first button 124, the second button 126, and the third button 128, the electronic device 100 may include a button support 1000. The button support 1000 may reside beneath the first housing 102 (X-direction) and may assist in providing a mechanical stroke and/or action, such as giving the first button 124, the second button 126, and the third button 128 tactility and mechanical action. This allows the first button 124, the second button 126, and the third button 128 to be depressed and returned to a resting state. In some instances, the electronic device 100 may include a button PCB for determining button presses, or may communicatively couple to one or more MLBs, PCBs, etc. of the electronic device 100.

In some instances, the display 110 may be a component of a cover 1002. The cover 1002 may be disposed over a front, or in front, of the first housing 102 and may represent a front surface of the electronic device 100. In such instances, the cover 1002 may include openings, slots, receptacle, and/or cut-outs for other components of the electronic device 100, such as the projector housing 116. These components may seal to the first housing 102 via one or more gaskets, fasteners (e.g., screw, adhesives, etc.), and/or alignment mechanisms. However, in some instances, the cover 1002 may be omitted and the display 110 may represent a front surface of the electronic device 100.

In some instances, the cover 1002 may include a substantially continuous surface and may be at least partially translucent (e.g., such as clear, transparent, etc.) such that the emitter 910 of the electronic device 100 may omit light therethrough. The continuous surface of the cover 1002 may also provide the electronic device with a uniform and aesthetic appearance. Additionally, the translucent material may allow one or more cameras (or sensors) located within the electronic device 100 to capture images and/or of the user and/or the environment. In some instances, the cover 1002 may include glass, clear plastic, or any other material that allows light to pass therethrough.

The electronic device 100 is shown including a projector housing assembly 1004 and a shutter assembly 1006, each of which are discussed herein in detail. Components of the projector housing assembly 1004 may reside within, or couple to, the projector housing 116. Additionally, the projector housing 116 may include a cavity for allowing air to circulate within the projector housing 116 and transferring heat away from components of the projector housing assembly 1004, such as the projector 800, the second camera 802, and the sensor 804. For example, the fan 902 may circulate air within the cavity.

The shutter assembly 1006 may couple to components of the electronic device 100, such as the first housing 102 and/or frames, brackets, mounts, etc. of the electronic device 100. The shutter assembly 1006 is actuatable to simultaneously cover (e.g., obstruct) and uncover (e.g., unobstruct) the first camera 112 and the second camera 802.

Figure 11:
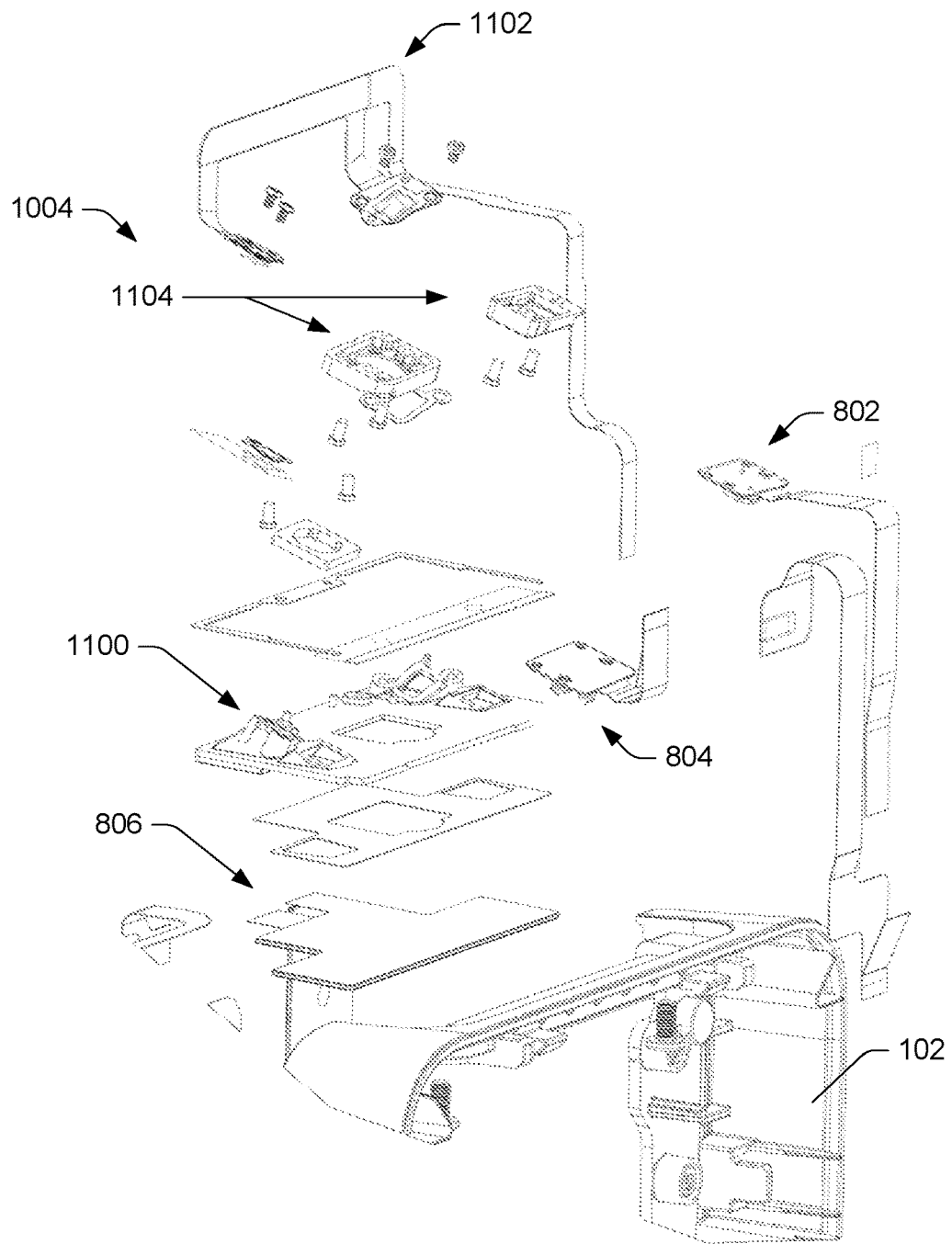
FIG. 11 illustrates a partial exploded view of the electronic device of FIG. 1, showing example components for capturing content within an environment of the electronic device, according to an embodiment of the present disclosure.

FIG. 11 illustrates a partially exploded view of the electronic device 100, showing example components of the projector housing assembly 1004.

The projector housing assembly 1004 may include the second camera 802 and the sensor 804. Flex circuits or other connectors may communicatively couple the second camera 802 and the sensor 804 to processing components of the electronic device 100, such as MLBs, PCBs, controllers, etc. The pane 806 may couple to the first housing 102 for protecting the second camera 802 and the sensor 804 from debris (as well as the projector 800).

The projector housing assembly 1004 is further shown including a frame 1100, which may receive the projector 800, the second camera 802, and/or the sensor 804. The frame 1100 may include components for respectively orienting the projector 800, the second camera 802, and/or the sensor 804. For example, the frame 1100 may include receptacles for receiving the projector 800, the second camera 802, and/or the sensor 804, or through which the projector 800, the second camera 802, and/or the sensor 804 are configured to present and/or capture content, respectively.

The projector housing assembly 1004 may include a flexible printed circuit assembly (FPCA) 1102 having one or more time of flight (TOF) sensors. The TOF sensors may be utilized to determine depth information within an environment of the electronic device 100. In some instances, the TOF sensors may be utilized along with the sensor 804 for determining interactions and/or locations of the interactions within the shared space. In some instances, the TOF sensors may mount to the frame 1100. Additionally, one or more baffles 1104 may assist in mounting or orienting the TOF sensors.

The projector housing assembly 1004 may further include any number of fasteners (e.g., screws), gaskets, seals, alignment mechanisms, adhesives, and so forth for assembling or coupling components of the projector housing assembly 1004 together. For example, adhesives may fasten the TOF sensors to the frame 1100.

Figure 12:
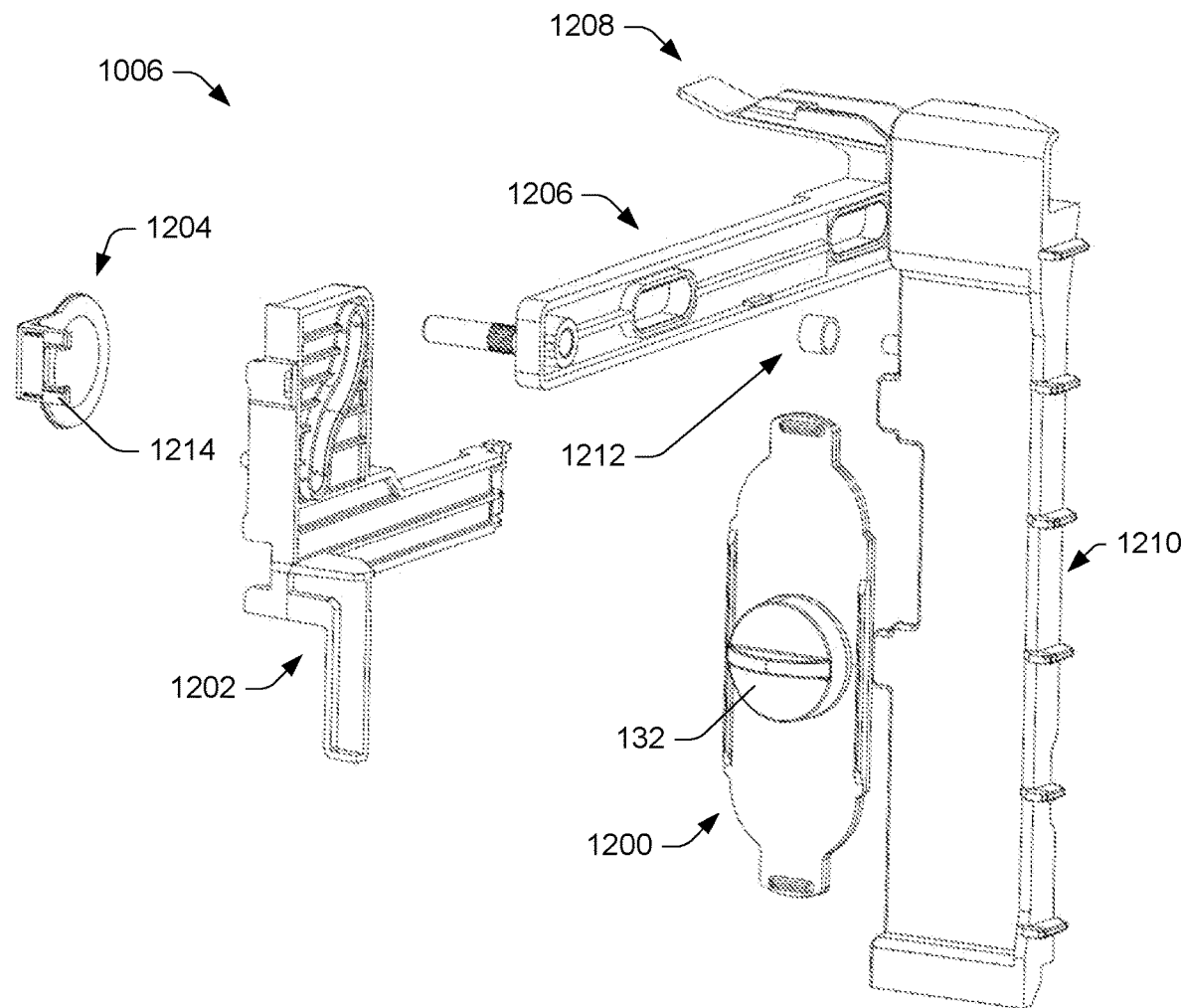
FIG. 12 illustrates a partial exploded view of the electronic device of FIG. 1, showing an example shutter assembly for providing privacy to user(s) of the electronic device, according to an embodiment of the present disclosure.

FIG. 12 illustrates a partially exploded view of the electronic device 100, showing example components of the shutter assembly 1006. Details of individual components of the shutter assembly 1006 are discussed herein, however, in some instances, the shutter assembly 1006 may include shutter switch 1200, having the knob 132, a shutter link 1202, having a first cover 1204, a shutter arm 1206, having a second cover 1208, and a shutter bracket 1210.

The components of the shutter assembly 1006 may operably couple together to permit actuation of the shutter switch 1200 to obstruct and unobstruct the first camera 112 and the second camera 802. For example, actuation of the shutter switch 1200 may cause components of the shutter assembly 1006 to maneuver and either obstruct or unobstruct the first camera 112 and the second camera 802. That is, a single actuation of the shutter switch 1200 may simultaneously obstruct or unobstruct the first camera 112 and the second camera 802. In some instances, the first cover 1204 may obstruct and unobstruct the first camera 112, while the second cover 1208 may obstruct and unobstruct the second camera 802. The first cover 1204 may obstruct the first camera 112 through being physically disposed with a field of view of the first camera 112. In some instances, the first cover 1204 may couple to the shutter link 1202. As the shutter link 1202 translates, a coupling of the first cover 1204 to the shutter link 1202 may cause the first cover 1204 to translate as well. In some instances, the first cover 1204 may include tabs 1214 that engage with features of the shutter link 1200 (as discussed herein). For example, the tabs 1214 may snap into keyways or other sockets of the shutter link 1200.

The second cover 1208 may obstruct the second cover 1208 through being physically disposed with a field of view of the second camera 802. In some instances, gaskets, bushings, or collars, such as collars 1212 may assist in the movement of components of the shutter assembly 1006. For example, the collars 1212 may include Teflon® collars or other frictional members that create interference fits within passages of the shutter arm 1206 to allow for movement of the shutter arm 1206.

Additionally, or alternatively, actuation of the shutter switch 1200 may enable and disable (e.g., power on or power off) the first camera 112 and/or the second camera 802. For example, the shutter switch 1200 may engage with a switch communicatively coupled to the first camera 112 and/or the second camera 802. When the shutter switch 1200 is actuated to obstruct the first camera 112 and the second camera 802 the shutter switch 1200 (or another component of the shutter assembly 1006) may engage the switch to disable the first camera 112 and the second camera 802. When the shutter switch 1200 is activated to unobstruct the first camera 112 and the second camera 802, the shutter switch 1200 may disengage with the switch to enable the first camera 112 and the second camera 802. In some instances, disabling the first camera 112 and the second camera 802 may include disabling one or more power rails of the first camera 112 and the second camera 802, respectively. In such instances, disabling power to one or more rails may disable a functionality of the first camera 112 and the second camera 802, respectively.

Figure 13:
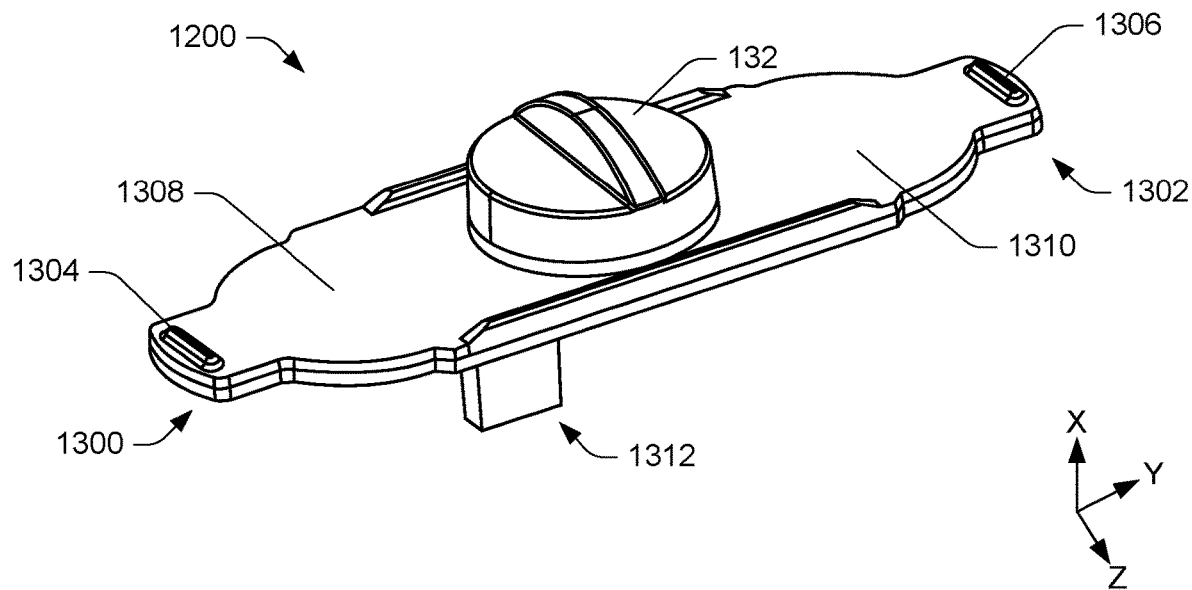
FIG. 13 illustrates an example component of the shutter assembly of FIG. 12, according to an embodiment of the present disclosure.

FIG. 13 illustrates the shutter switch 1200 of the shutter assembly 1006. The shutter switch 1200 includes an elongated body, having a first end 1300 and a second end 1302. The knob 132 is sized and shaped to fit within the channel 134 of the first housing 102. For example, when coupled to the first housing 102, the knob 132 may be disposed through the channel 134 for being grasped by the user. The shutter switch 1200, as discussed above, is configured to maneuver between a position at which the shutter assembly 1006 obstructs cameras of the electronic device 100, and a position at which the shutter assembly 1006 does not obstruct cameras of the electronic device 100. In some instances, shutter switch 1200 may include features for permitting translation of the shutter switch 1200 once coupled to the first housing 102 (e.g., slides, keyways, etc.).

The first end 1300 may include a first projection 1304 and the second end 1302 may include a second projection 1306. The first projection 1304 and the second projection 1306 may engage with corresponding protrusions (or slots) of the first housing 102. For example, the first housing 102 may include a first slot, protrusion, etc. in which the first projection 1304 engages when the shutter switch 1200 is actuated to obstruct the cameras, and a second slot protrusion, etc. in which the second projection 1306 engages when the shutter switch 1200 is actuated to unobstruct the cameras. The engagement between the first projection 1304 and the second projection 1306 with the first protrusion and the second protrusion, respectively, may provide haptic feedback to the user to indicate the position of the shutter switch 1200 (e.g., snap-like feel, click-like feel, etc.).

The shutter switch 1200 may include indicators to visually indicate whether the shutter assembly 1006 is obstructing the cameras or not obstructing the cameras. For example, the shutter switch 1200 may include a first portion 1308 having a first color (e.g., white, green, etc.) that indicates that the shutter assembly 1006 is not obstructing the cameras. That is, when the shutter switch 1200 is advanced to a top-most position, the first portion 1308 may be visible within the channel 134, indicating that the shutter assembly 1006 is not obstructing the cameras. Alternatively, a second portion 1310 may have a second color (e.g., red, orange, etc.) that indicates that the shutter assembly 1006 is obstructing the cameras. That is, when the shutter switch 1200 is advanced to a bottom-most position, the second portion 1310 may be visible within the channel 134, indicating that the shutter assembly 1006 is obstructing the cameras.

The shutter switch 1200 may also include a protrusion 1312 for engaging with additional components of the shutter assembly 1006 for transferring motion to either obstruct or uncover the cameras.

Figure 14:
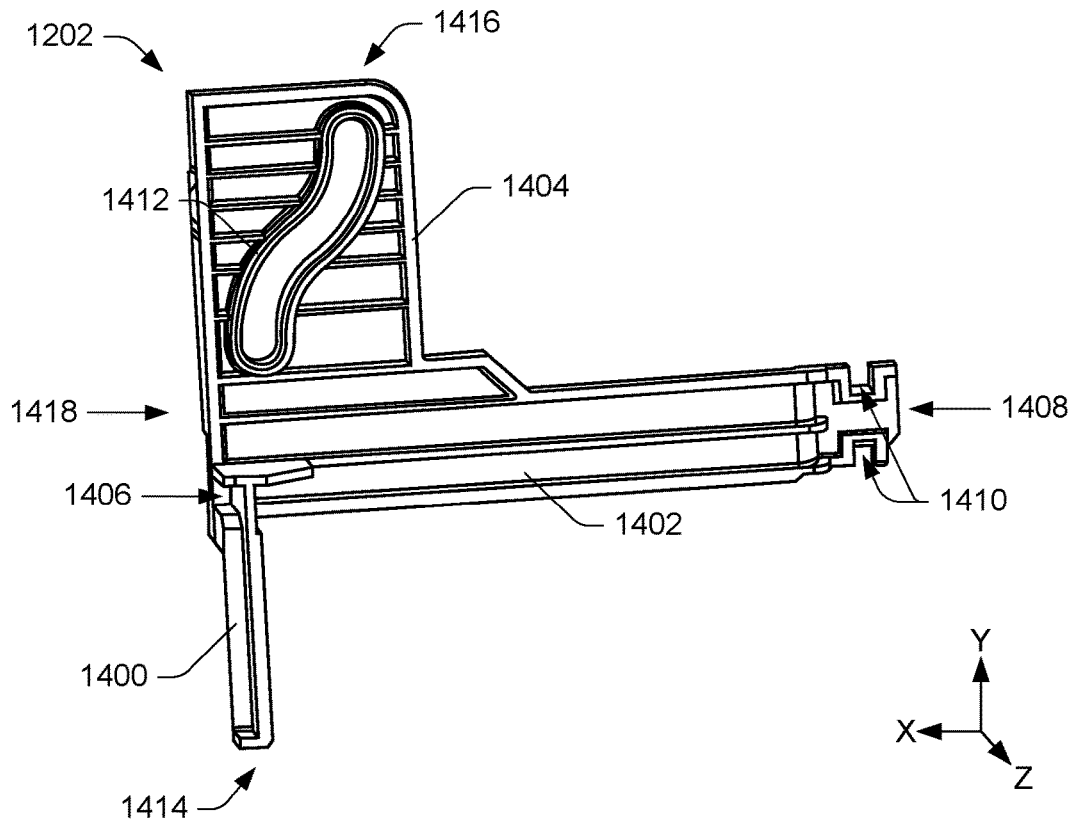
FIG. 14 illustrates an example component of the shutter assembly of FIG. 12, according to an embodiment of the present disclosure.

FIG. 14 illustrates the shutter link 1202 of the shutter assembly 1006. The shutter link 1202 is shown including vertical member 1400, a horizontal member 1402, and a flange 1404. The vertical member 1400 may engage with at least a portion of the shutter switch 1200 for imparting motion to the shutter link 1202. As such, when the shutter switch 1200 vertically translates (Y-direction), the shutter link 1202 may vertically translate as well. For example, the vertical member 1400 (or the shutter link 1202) may include a pocket 1406 within which the protrusion 1312 of the shutter switch 1200 engages.

The vertical member 1400 may also align the shutter link 1202 within the electronic device 100. For example, surfaces of the vertical member 1400 may engage with channels, slots, etc. of the first housing 102. The engagement of the vertical member 1400 with the first housing 102 in this manner may avoid the shutter link 1202 skewing or repositioning to undesired positions with the electronic device 100 during actuation. In other words, the vertical member 1400 may assist the shutter link 1202 vertically translating (up and down) within the electronic device 100 as the shutter switch 1200 is actuated.

The horizontal member 1402 extends transversely from the vertical member 1400, in a direction towards a center of the electronic device 100 (X-direction). The horizontal member 1402 includes a distal end 1408 having keyways 1410 (e.g., slots, indents, etc.). The keyways 1410 may engage with correspond features of the first cover 1204. For example, the keyways 1410 may receive the tabs 1214 of the first cover 1204 for coupling the first cover 1204 and the shutter link 1200 together. In doing so, as the shutter link 1202 translates (e.g., up and down in the Y-direction), the first cover 1204 may correspondingly translate to obstruct and uncover the first camera 112.

The flange 1404 is shown including a channel 1412 that acts a cam for actuating the shutter arm 1206. For example, as discussed herein, the shutter arm 1206 may include a pin that is received by the channel 1412. Correspondingly, the channel 1412 may be sized to receive the pin for translating the shutter arm 1206. The channel 1412 is shown extending in multiple directions, such as snaking or winding through the flange 1404. For example, the channel 1412 may extend in a first direction, from a bottom end 1414 of the shutter link 1202 to a top end 1416 of the shutter link 1202 (Y-direction). Additionally, the channel 1412 may extend in a second direction that is transverse to the first direction, such as from a proximal end 1418 of the shutter link 1202 to the distal end 1408 of the shutter link 1202 (X-direction). The channel 1412 may therefore extend in the first direction, towards the top end 1416, curve outward from the proximal end 1418, in the second direction towards the distal end 1408, and extend towards the top end 1416. The channel 1412 may include a serpentine path as the channel 1412 extends in a direction from the bottom end 1414 to the top end 1416.

Figure 15:
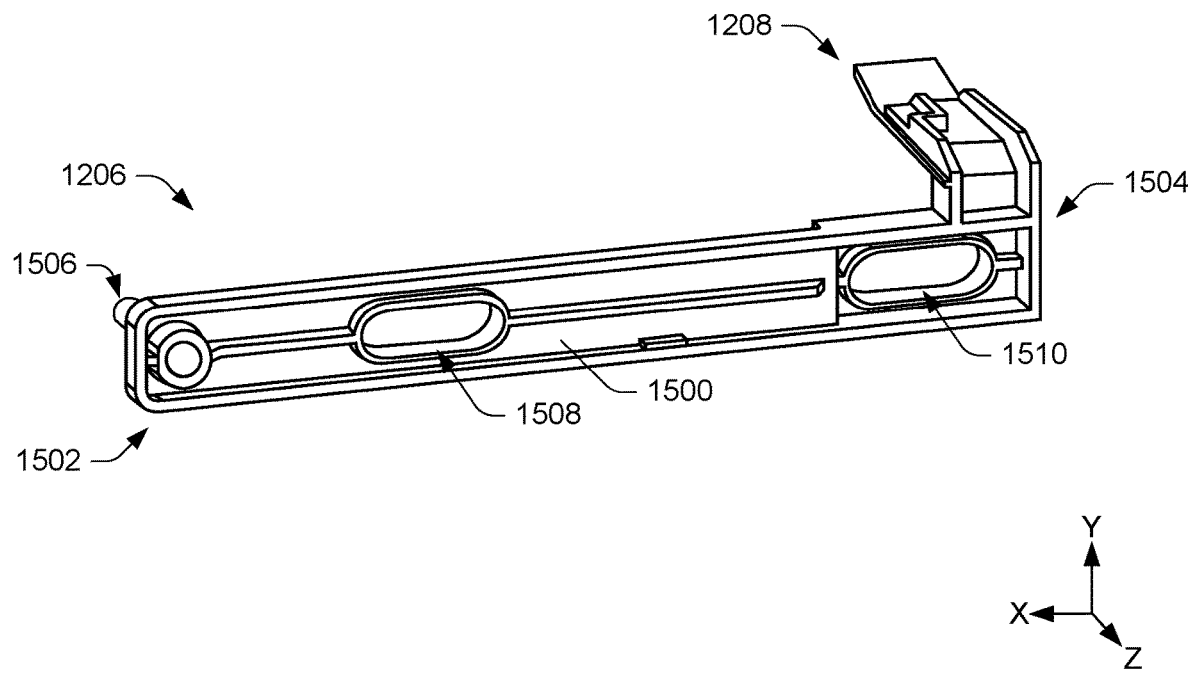
FIG. 15 illustrates an example component of the shutter assembly of FIG. 12, according to an embodiment of the present disclosure.

FIG. 15 illustrates the shutter arm 1206, which may represent a slider for obstructing and unobstructing the second camera 802. The shutter arm 1206 is configured to translate within the electronic device 100 for obstructing and unobstructing the second camera 802. The shutter arm 1206 is shown including an elongated body 1500 that extends between a proximal end 1502 and a distal end 1504. The proximal end 1502 includes a pin 1506 that engages within the channel 1412. For example, the pin 1506 may slide or traverse within the channel 1412 as the shutter link 1202 is actuated (e.g., via the shutter switch 1200). The distal end 1504 includes the second cover 1208 for obstructing and unobstructing the second camera 802. As shown, the second cover 1208 may extend away from a longitudinal direction of the shutter arm 1206, so as to be disposed within the projector housing 116 for obstructing and unobstructing the second camera 802.

The elongated body 1500 defines a first passage 1508 and a second passage 1510. As discussed herein, fasteners may be disposed through the first passage 1508 and the second passage 1510, respectively, for coupling the shutter arm 1206 to the first housing 102. For example, the fasteners may translate between or within ends of the first passage 1508 and the second passage 1510, respectively. That is, as the shutter link 1202 actuates, this actuation is imparted into the shutter arm 1206 (via the pin 1506 engaging with channel 1412), and the shutter arm 1206 may translate between the fasteners. As such, movement of the shutter arm 1206 may be limited as the fasteners come into contact with ends of the first passage 1508 and the second passage 1510, respectively.

The fasteners disposed through the first passage 1508 and the second passage 1510 may also permit the sliding movement of the shutter arm 1206 during actuation of the shutter switch 1200. For example, the engagement between the fasteners and the first passage 1508 and the second passage 1510 may align the shutter arm 1206 within the electronic device 100 for obstructing and unobstructing the second camera 802.

Figure 16:
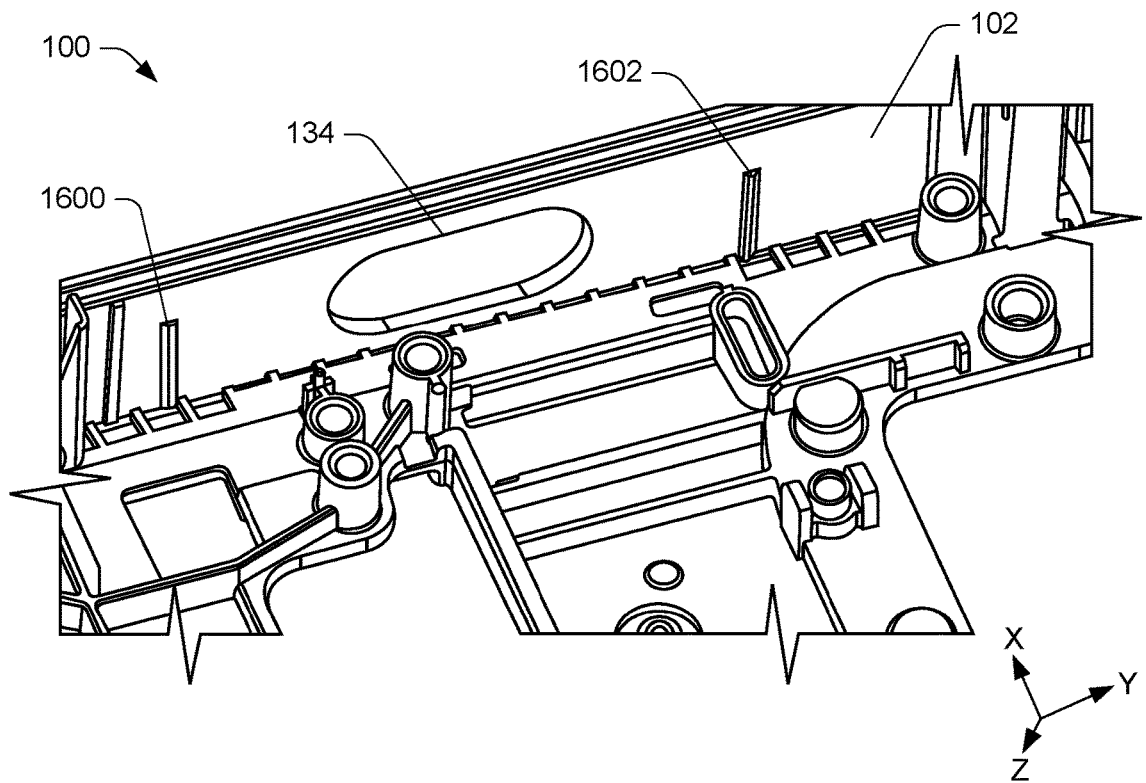
FIG. 16 illustrates an example housing of the electronic device of FIG. 1, according to an embodiment of the present disclosure.

FIG. 16 illustrates an interior of the first housing 102, including the channel 134 through which the knob 132 of the shutter switch 1200 may extend. The first housing 102 is further shown including a first protrusion 1600 (e.g., jut, bulge, etc.) and a second protrusion 1602 that may, in some instances, extend outward from the first housing 102 (X-direction). The first protrusion 1600 and the second protrusion 1602 may engage with the first projection 1304 and the second projection 1306 of the shutter switch 1200, respectively.

For example, when the shutter link 1202 is advanced downward to obstruct the first camera 112 and second camera 802, the first projection 1304 pass over the first protrusion 1600. This may provide a haptic feel (e.g., snap-like) that indicates the shutter assembly 1006 is obstructing the first camera 112 and the second camera 802. Comparatively, when the shutter link 1202 is advanced upwards to actuate the shutter assembly 1006 to unobstruct the first camera 112 and the second camera 802, the first projection 1304 may pass over the first protrusion 1600, and upon advancing further upwards, the second projection 1306 pass over the second protrusion 1602. This may provide a haptic feel (e.g., snap-like) that indicates the shutter assembly 1006 is not obstructing the first camera 112 and the second camera 802. As such, when the shutter assembly 1006 is in the first position to uncover the first camera 112 and the second camera 802, the second projection 1306 may engage with the second protrusion 1602, and when the shutter assembly 1006 is in the second position to obstruct the first camera 112 and the second camera 802, the first projection 1304 may engage with the first protrusion 1600.

Figure 17:
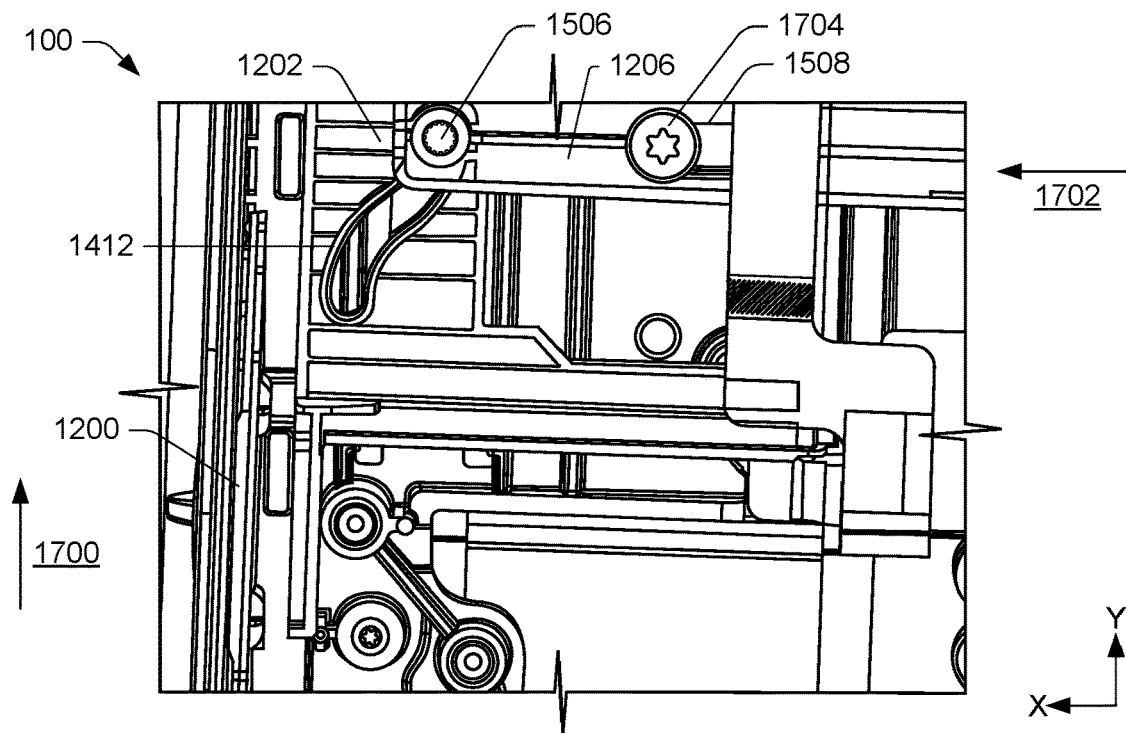
FIG. 17 illustrates a partial view of the electronic device of FIG. 1, showing the shutter assembly of FIG. 12 disposed within the electronic device, according to an embodiment of the present disclosure.

FIG. 17 illustrates an engagement between the shutter link 1202 and the shutter arm 1206. The knob 132 of the shutter switch 1200 is shown disposed through the channel 134 of the first housing 102, and engaging with the shutter link 1202. For example, the protrusion 1312 of the shutter switch 1200 may engage with the pocket 1406 of the shutter link 1202. In doing so, as the shutter switch 1200 translates (e.g., up and down in the Y-direction), the shutter link 1202 may correspondingly translate.

The pin 1506 of the shutter arm 1206 is shown being disposed within the channel 1412 of the shutter link 1202. For example, the pin 1506 is shown being extended to a top-most position of the channel 1412. At this position, the shutter link 1202 may not be actuated downwards given the interaction between the pin 1506 and an end of the channel 1412. In FIG. 17, the shutter assembly 1006 is in a position associated with obstructing the first camera 112 and the second camera 802. However, the as the shutter link 1202 is actuated upwards, the engagement between the pin 1506 and the channel 1412 may actuate to advance the shutter arm 1206 and uncover the first camera 112 and the second camera 802. This may be accomplished, in part, given the serpentine path of the channel 1412.

To elaborate, from the view shown in FIG. 17, the shutter switch 1200 may be actuated in a first direction 1700 (Y-direction). With this actuation, the shutter link 1202 may also advance in the first direction 1700, and in doing so, the first cover 1204 may uncover the first camera 112. At the same time, when the shutter link 1202 is advanced in the first direction 1700, the shutter arm 1206 may be pulled in a second direction 1702 (X-direction). The second direction 1702 may be transverse to the first direction 1700. More particularly, the shutter arm 1206 is advanced in the second direction 1702 given the engagement between the pin 1506 and the channel 1712. For example, as shown, as the shutter link 1202 is advanced in the first direction 1700, the pin 1506 may follow a curvature of the channel 1412 to advance the shutter arm 1206 in the second direction 1702. This causes the second cover 1208 on the shutter arm 1206 to uncover the second camera 802.

Movement of the shutter arm 1206 is also permitted via a first fastener 1704, which is engaged or residing within the first passage 1508 of the shutter arm 1206. As shown in FIG. 17, the shutter arm 1206 may be advanced in the second direction 1702 given the position of the first fastener 1704 in the first passage 1508 (e.g., abutting an end of the first passage 1508). In some instances, the first fastener 1704 may be disposed through the collar 1212, which engages with an interior surface of the first passage 1508. The collar 1212 may be made of Teflon® for assisting in the translation movement of the shutter arm 1206 in the second direction 1702.

Figure 18:
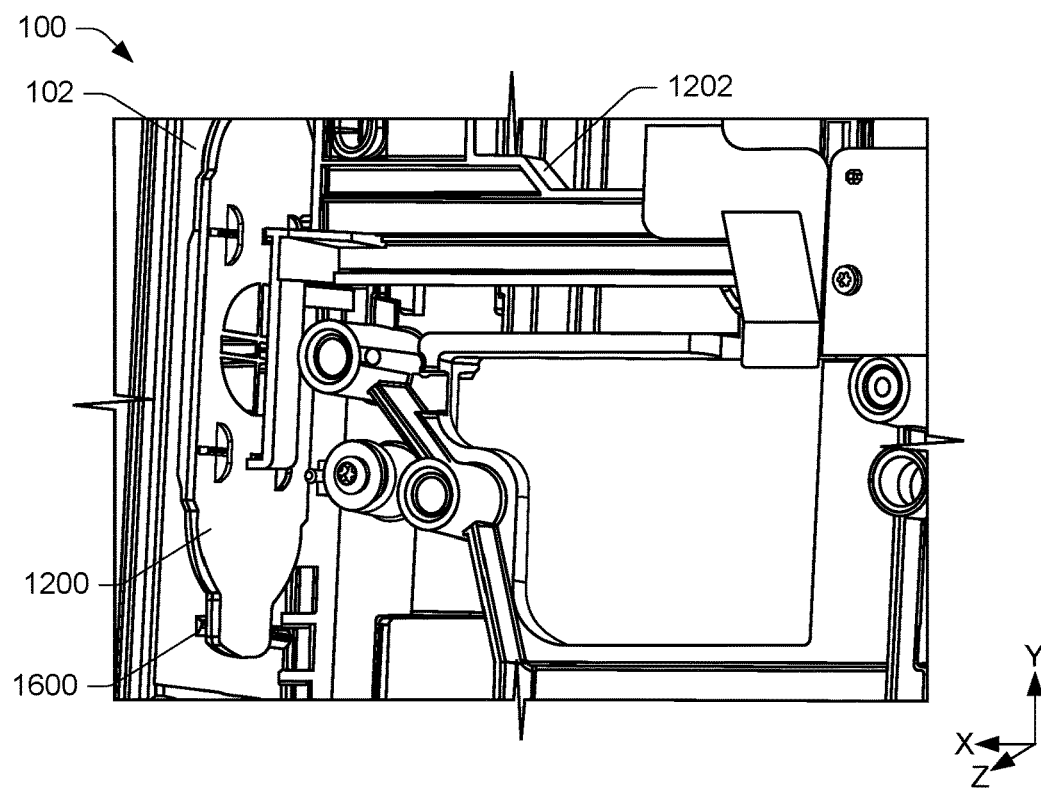
FIG. 18 illustrates a partial view of the electronic device of FIG. 1, showing the shutter assembly of FIG. 12 disposed within the electronic device, according to an embodiment of the present disclosure.

FIG. 18 illustrates the shutter switch 1200 engaged with the first housing 102. For example, as shown, the shutter switch 1200 may be disposed against a side of the first housing 102, for disposing the knob 132 through the channel 134.

The shutter switch 1200 is also shown engaged with the shutter link 1202. For example, the protrusion 1312 of the shutter switch 1200 may be received within the pocket 1406 of the shutter link 1202. However, the shutter switch 1200 and/or the shutter link 1202 may include additional features (e.g., slots, tabs, projections, etc.) for coupling the shutter switch 1200 and the shutter link 1202 together.

As also illustrated in FIG. 18, the first projection 1304 of the shutter link 1202 may engage with the first protrusion 1600 of the first housing 102. Additionally, although not shown in FIG. 18, the shutter bracket 1210 may dispose the shutter switch 1200 against the first housing 102 to permit engagement between the first projection 1304 and the first protrusion 1600 of the first housing 102. For example, the shutter bracket 1210 may hold the shutter switch 1200 against a sidewall of the first housing 102. In some instances, foam may be disposed between the shutter bracket 1210 and the shutter switch 1200 provide a force that holds the shutter switch 1200 against a sidewall of the first housing 102.

Figure 19:
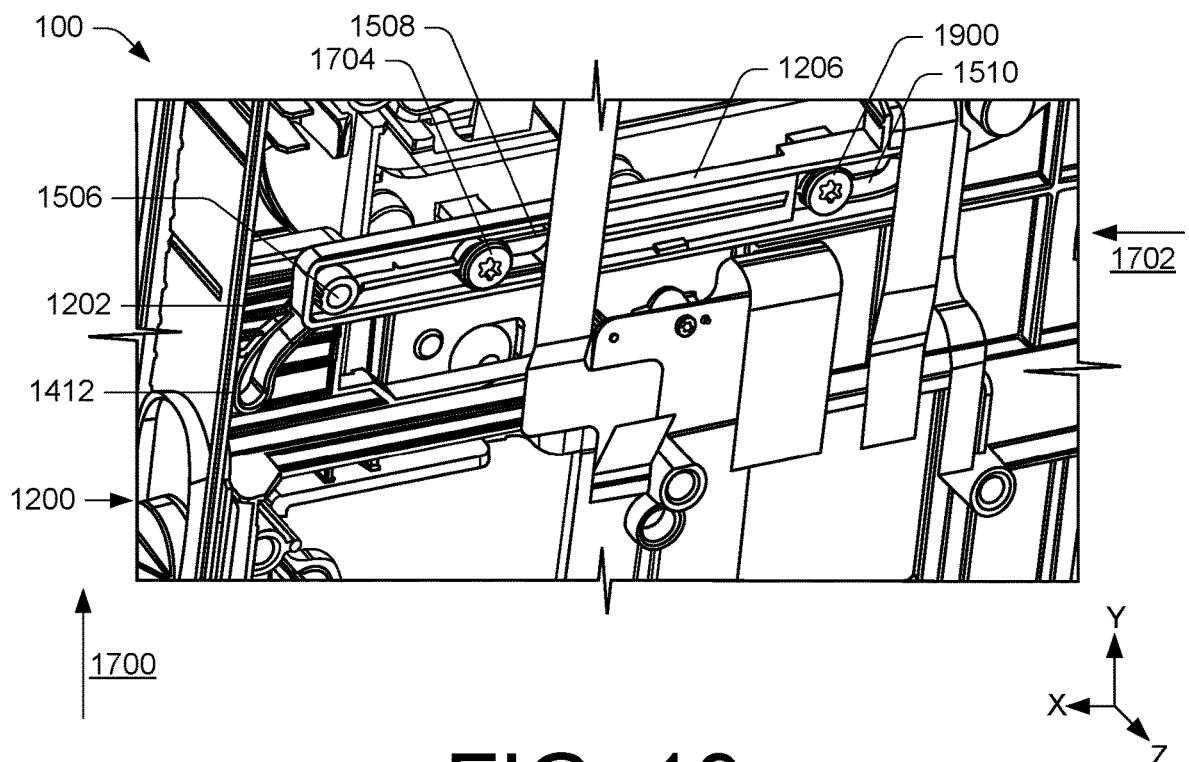
FIG. 19 illustrates a partial view of the electronic device of FIG. 1, showing the shutter assembly of FIG. 12 disposed within the electronic device, according to an embodiment of the present disclosure.

FIG. 19 illustrates the shutter link 1202 engaged with shutter arm 1206. As discussed above, the pin 1506 engages within the channel 1412 of the shutter link 1202 for actuating the shutter arm 1206 between positions for obstructing and unobstructing the second camera 802. As shown in FIG. 19, the shutter assembly 1006 is in the second position associated with obstructing the first camera 112 and the second camera 802.

The shutter arm 1206 is shown being secured within the electronic device 100 (e.g., to the first housing 102) via the first fastener 1704 and a second fastener 1900. The first fastener 1704 is shown residing within the first passage 1508 and the second fastener 1900 is shown residing within the second passage 1510. In some instances, the second fastener 1900 may be disposed through the collar 1212 that engages within an interior of the second passage 1510. The collar 1212 may create an interference fit with the second passage 1510. As the shutter arm 1206 actuates, the first fastener 1704 and the second fastener 1900 may translate within the first passage 1508 and the second passage 1510, respectively, between ends thereof. That is, the shutter arm 1206 may actuate to dispose the first fastener 1704 and the second fastener 1900 between ends of the first passage 1508 and the second passage 1510, respectively. In some instances, bushings may be disposed around the first fastener 1704 and the second fastener 1900 and engage with the first passage 1508 and the second passage 1510, respectively. The bushings may assist in translational movement of the shutter arm 1206 in the second directions 1702.

As the shutter switch 1200 is actuated in the first direction 1700, the shutter arm 1206 may be actuated in the second direction 1702. That is, from the position shown in FIG. 19, the shutter switch 1200 may be advanced in the first direction 1700 (i.e., upwards in the Y-direction). The engagement between the pin 1506 and the channel 1412 may effectuate to translate actuation of the shutter link 1202 in the first direction 1700 to actuation of the shutter arm 1206 in the second direction 1702. In some instances, the first direction 1700 and the second direction may be orthogonal (i.e., perpendicular) to one another.

Figure 20:
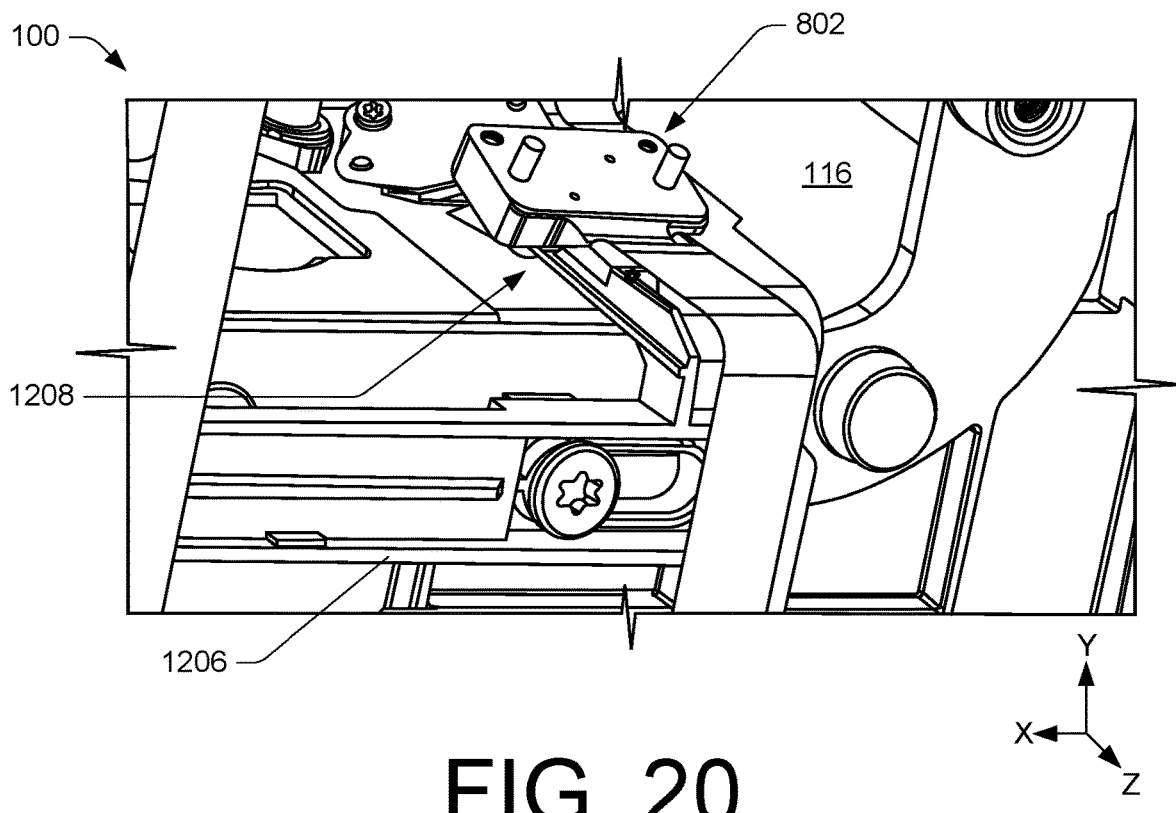
FIG. 20 illustrates a partial view of the electronic device of FIG. 1, showing the shutter assembly of FIG. 12 disposed within the electronic device, according to an embodiment of the present disclosure.

FIG. 20 illustrates the second cover 1208 being disposed within a field of view of the second camera 802. In doing so, the second cover 1208 may obstruct the second camera 802 for capturing images and/or videos. As discussed above, the second camera 802 may be disposed within the projector housing 116. As such, the second cover 1208 transversely extends from the shutter arm 1206, in a direction towards the projector housing (Z-direction), so as to be disposed within the projector housing 116.

Figure 21:
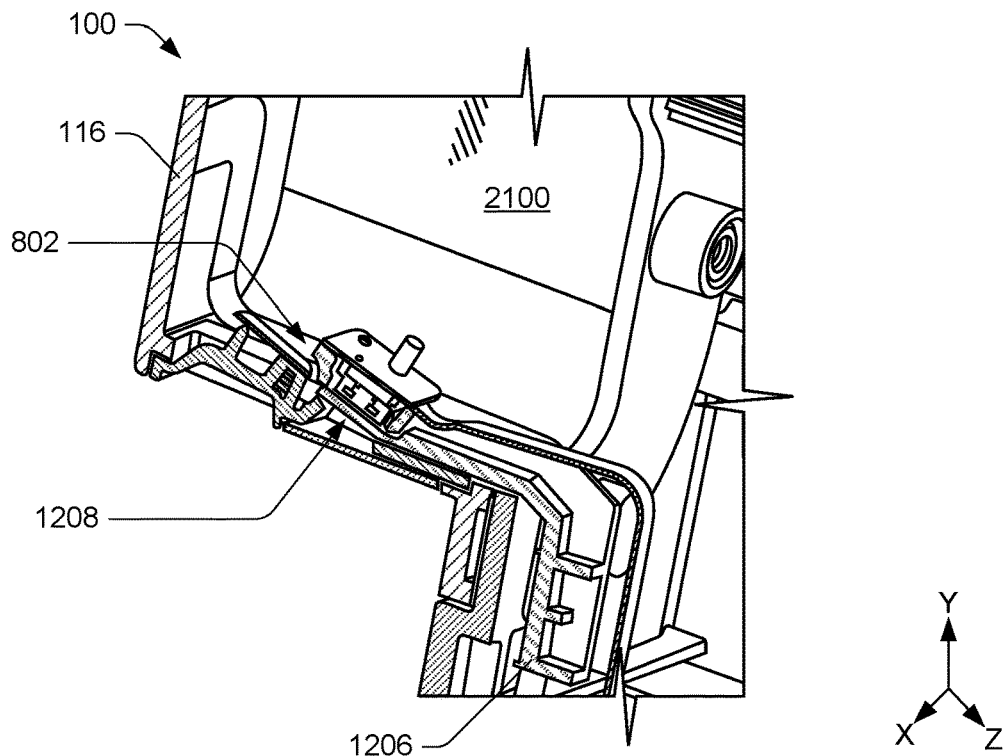
FIG. 21 illustrates a partial cross-sectional view of the electronic device of FIG. 1, showing the shutter assembly of FIG. 12 disposed within the electronic device, according to an embodiment of the present disclosure.

FIG. 21 illustrates a partial cross-sectional view of the projector housing 116, showing the second cover 1208 disposed within a field of view of the second camera 802. As illustrated, the second cover 1208 may extend from the shutter arm 1206 for being disposed within the field of view of the second camera 802. Advancing the second cover 1208 in the second direction 1702 (X-direction) unobstructs the second camera 802 and permits the second camera 802 to capture images and/or videos.

The projector housing 116 is further shown including a cavity 2100 within which components may reside (e.g., projector sub-assembly 900, the second camera 802, etc.). The cavity 2100 may fluidly connect to the fan 902 of the electronic device 100 to allow air to be circulated within the projector housing 116 for dissipating heat generated by the projector 800, the second camera 802, the sensor 804, etc.

Figure 22:
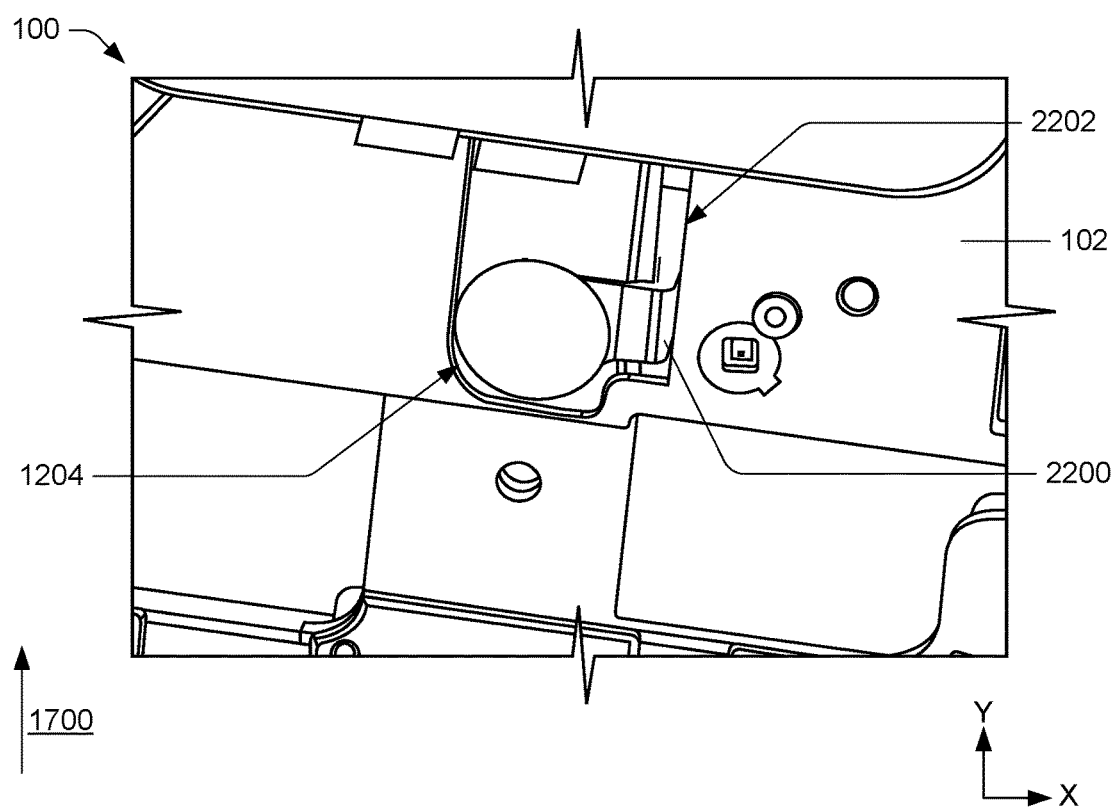
FIG. 22 illustrates a partial view of the electronic device of FIG. 1, showing the shutter assembly of FIG. 12 disposed within the electronic device, according to an embodiment of the present disclosure.

FIG. 22 illustrates the first cover 1204 obstructing the first camera 112. The first cover 1204 is shown including a generally circular shape for obstructing a field of view of the first camera 112. The first cover 1204 is actuated via a support 2200 coupled to the keyways 1410 of the shutter link 1202. The support 2200 is shown extending through a slit 2202 of the first housing 102. Within the slit 2202, the support 2200 may translate (Y-direction) for obstructing and unobstructing the first camera 112.

As shown in FIG. 22, the first cover 1204 is obstructing the first camera 112. However, the shutter link 1202 may actuate in the first direction 1700, which in turn, actuates the support 2200 upward, in the first direction 1700, within the slit 2202 (Y-direction). This actuation uncovers the first camera 112, or disposes the first cover 1204 out of a field of view of the first camera 112. The support 2200 may include keys that engage with the keyways 1410 in the shutter link 1202 for coupling the first cover 1204 to the shutter link 1202.

Figure 23:
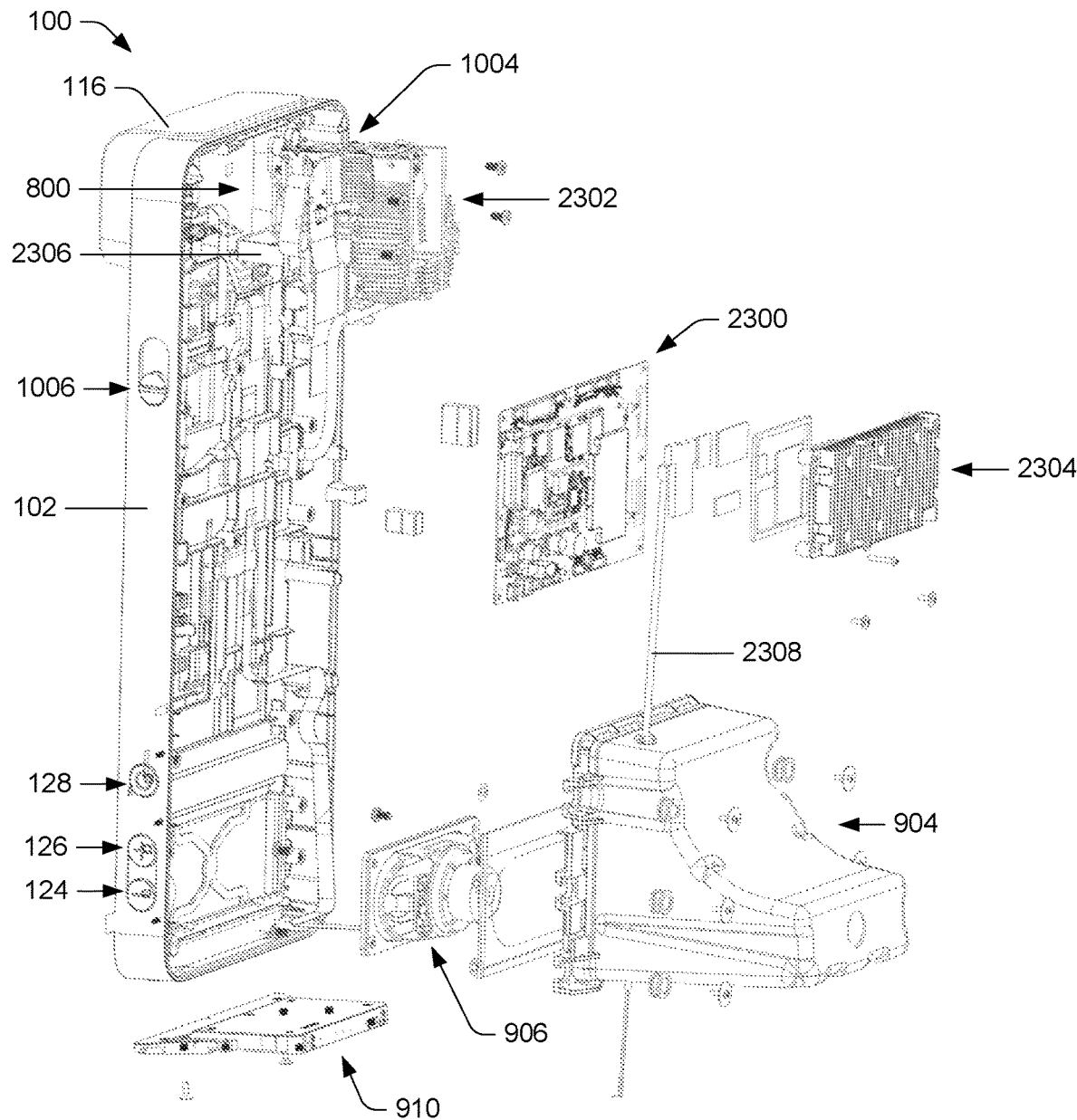
FIG. 23 illustrates a partial exploded view of the electronic device of FIG. 1, according to an embodiment of the present disclosure.

FIG. 23 illustrates a partially exploded view of the electronic device 100. The projector housing 116, the first button 124, the second button 126, the third button 128, the shutter assembly 1006, and the display 110 are shown coupled to the first housing 102. In some instances, gaskets, seals, and/or bushings may couple the projector housing 116, for example, to the first housing 102.

The electronic device 100 includes a main logic board (MLB) 2300 that carries out and perform functions of the electronic device 100. For example, the MLB 2300 may cause content to be presented on the display 110 and/or may recognize touch gestures on the display 110. In some instances, the MLB 2300 may include any number of processors, memory, circuits, transformers, power supplies, and so forth. Additional computing components of the electronic device 100 may couple to the MLB 2300 and/or the electronic device 100 may include additional PCBs, modules, etc. For example, the electronic device 100 may include one or more antennas for communicatively coupling the electronic device 100 to one or more additional computing devices, such as mobile phones, tablets, computers, portable audio input/output devices, and/or any other computing device capable of communication.

In some instances, the antennas (or interfaces) may include ZigBee, Bluetooth, Bluetooth Low Energy (BLE), Wi-Fi, adaptive frequency technology (AFT), or the like. In some instances, the electronic device 100 may include multiple antennas to reduce latency in transmissions between the electronic device 100 and/or one or more communicatively coupled computing devices. In some instances, the antennas may be located proximal to the top 118 of the electronic device to increase a received signal strength of data and/or provide increased connections when communicatively coupled to computing devices. In some instances, the antennas may be located on the MLB 2300, one or more PCBs within the first housing 102 and/or the second housing 104, and/or elsewhere within the electronic device 100.

The electronic device 100 may include one or more heat dissipating frames, elements, heatsinks, or pads to dissipate heat generated by components of the electronic device 100. For instance, the processor(s), the display 110, power supply(ies), the MLB 2300, the projector 800, and so forth may generate heat during use. To dissipate heat the electronic device 100 may include one or more heat dissipating elements. The heat dissipating elements may serve to reduce a touch temperature of the electronic device 100 and prevent the electronic device 100 overheating. For example, the electronic device 100 may include a first heat dissipating element 2302 coupled to the projector 800 and a second heat dissipating element 2304 coupled to the MLB 2300. In some instances, the first heat dissipating element 2302 may be a component of the projector sub-assembly 900. The first heat dissipating element 2302 and the second heat dissipating element 2304 may include fins, coils, and/or adequate surface area to dissipate generated heat. The first heat dissipating element 2302 and the second heat dissipating element 2304 may include materials for effectively dissipating heat, such as copper, magnesium, and/or aluminum. However, although illustrated as having a certain number of heat dissipating elements, the electronic device 100 may include any number of heat dissipating elements.

The projector sub-assembly 900 includes the projector 800 as well as a bracket 2306 for orienting the projector 800. In some instances, components of the projector sub-assembly 900 may mount to the bracket 2306. In some instances, the first heat dissipating element 2302 may couple to the projector 800, or the bracket 2306, for dissipating heat generated by the projector 800. The bracket 2306 may couple to components of the first housing 102, the second housing 104, and/or the projector housing 116. Additionally, the projector sub-assembly 900 may include flex circuits for communicatively coupling the projector 800 (or modules thereof) to components of the electronic device 100, such as the MLB 2300.

The loudspeaker 906 is shown disposed proximal to the bottom 120 of the electronic device 100. The loudspeaker 906 is oriented to output sound in a direction towards the front 106 of the electronic device 100, through the orifices 122. The loudspeaker 906 may be at least partially received within the loudspeaker housing 904. The loudspeaker housing 904 may provide back volume to the loudspeaker 906 to enhance audio characteristics of the electronic device 100. For example, the loudspeaker housing 904 may include a chamber or cavity to provide back volume to the loudspeaker 906. The loudspeaker housing 904 may include a shape and size for residing within the leg 500 of the second housing 104 once the electronic device 100 is assembled. A cable 2308 may communicatively couple the loudspeaker 906 to the MLB 2300 for receiving power and/or causing output of audio.

The electronic device 100 includes the emitter 910, which in some instances, may include a laser emitter or an IR emitter. The emitter 910 may include a wide-angle lens for emitting light within the shared space. The emitter 910 may emit light through the transparent area 300 of the first housing 102 (or of the cover 1002) to generate a plane of light in front of the electronic device 100. The plane of light may be used to sense touch inputs, or interactions, by the sensor 804.

The electronic device 100 may include any number of flex circuits, wires, fibers, cables, and so forth for communicatively couple components of the electronic device 100. Additionally, additional components may couple to, or be disposed on, the MLB 2300. For example, shielding plates, grounding foams, and/or isolating foams may to guard against incoming or outgoing emissions of electromagnetic frequencies of the electronic device 100.

Figure 24:
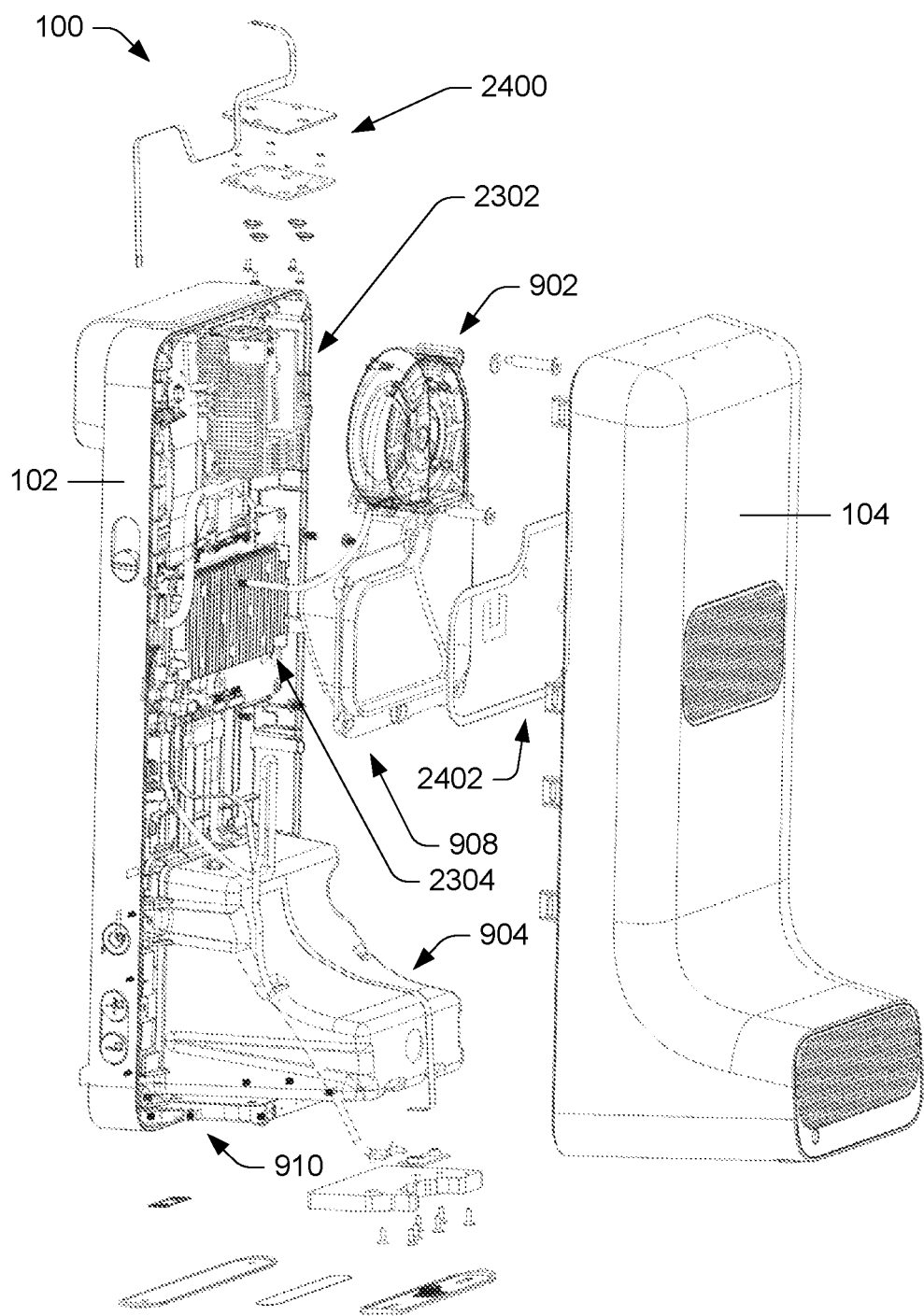
FIG. 24 illustrates a partial exploded view of the electronic device of FIG. 1, according to an embodiment of the present disclosure.

FIG. 24 illustrates a partially exploded view of the electronic device 100. In FIG. 24, the first heat dissipating element 2302, the second heat dissipating element 2304, the loudspeaker housing 904, and the emitter 910 are shown coupled to the first housing.

The electronic device 100 include a microphone PCB 2400 which generates audio signals via sound captured by microphones 600 of the electronic device 100. The microphone PCB 2400 may include respective microphones of the electronic device 100. For example, as discussed above, the electronic device 100 may include four microphones 600, and in such instances, the microphone PCB 2400 may support and/or include the microphones 600. In some instances, the microphones 600 may be oriented towards the top 118, or the microphone PCB 2400 may orient the microphones 600 towards the top 118 of the electronic device 100. The microphone PCB 2400 communicatively couple to the MLB 2300 via one or more flex circuits, for example.

The second housing 104 may include corresponding microphone ports (e.g., four) that extend through a thickness of the second housing 104. The microphone ports may direct sound from an exterior of the electronic device 100 to within an interior of the electronic device 100. In some instances, the microphone port(s) may be sealed or covered with an acoustic mesh or membrane material that prevents or substantially prevents the ingress of debris (e.g., dust) or moisture into the interior of the electronic device 100, while allowing sound to permeate therethrough and reach the microphone(s). The mesh may also acoustically seal the microphones 600.

The fan 902 resides within an interior of the electronic device 100. The fan is configured to draw air through the electronic device 100, from the inlet 206 to the outlet 208. As discussed above, the fan 902 may draw air across the display 110, the projector 800, the first heat dissipating element 2302, and the second heat dissipating element 2304. The fan 902 may couple to the manifold 908, which may help direct the air within electronic device 100. In some instances, the manifold 908 may direct air out of the outlet 208. For example, the manifold 908 may couple to the second housing 104 to fluidly connect the manifold 908 to the outlet 208. A gasket 2402 may assist in sealing the manifold 908 to the second housing 104.

Once the first housing 102 and the second housing 104 couple together, the electronic device 100 may form a compact enclosure for components of the electronic device 100. Once coupled, the second housing 104 may enclose or encapsulate components coupled to the first housing 102 (e.g., the MLB 2300.). Additionally, upon assembly, the electronic device 100 may have a smooth, compact, and aesthetic appearance with no visible fasteners or wires.

In some instances, the first housing 102 and the second housing 104 may snap together. To permit coupling of the first housing 102 and the second housing 104, the first housing 102 and the second housing 104 may respectively include attachment mechanisms. For example, the first housing 102 may include first attachment mechanisms that engage with second attachment mechanisms of the second housing 104. By way of example, the first attachment mechanisms may resemble tabs, hooks, protrusions, keys, keyways, slots, other male/female connectors, and/or a combination thereof, which are complimentary to engage the second attachment mechanisms. In some instances, individual attachment mechanisms of the first attachment mechanisms may engage with individual attachment mechanisms of the second attachment mechanisms. The first housing 102 and the second housing may include complimentary alignment mechanisms for aligning the first housing 102 and the second housing 104 upon assembly (e.g., pins, tabs, etc.).

Figure 25:
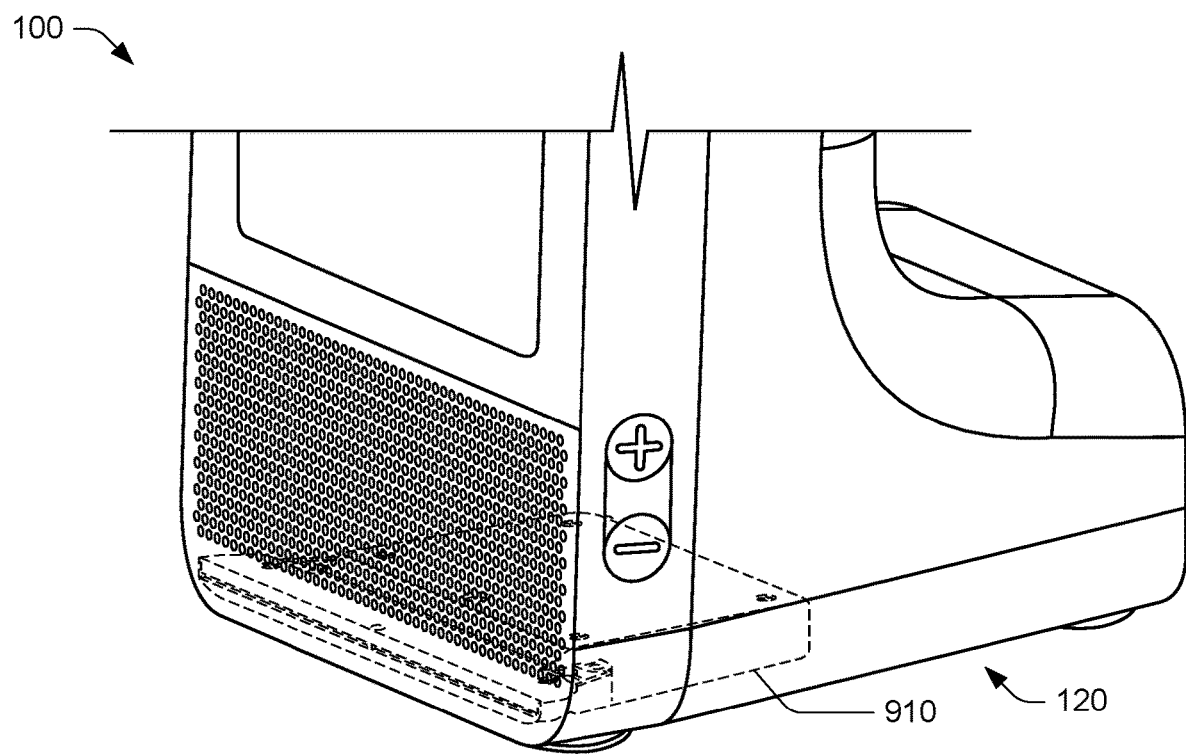
FIG. 25 illustrates a front perspective view of the electronic device of FIG. 1, showing an example emitter of the electronic device, according to an embodiment of the present disclosure.
Figure 25:
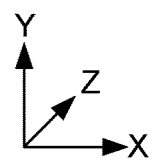

FIG. 25 illustrates the emitter 910 of the electronic device 100. As illustrated, the emitter 910 is disposed proximal to the bottom 120, beneath (Y-direction) the loudspeaker 906. The emitter 910 is oriented and arranged to output light (e.g., laser) toward the front 106 of the electronic device 100. For example, as discussed above, light emitted by the emitter 910 may pass through the transparent area 300 of the first housing 102 (or of the cover 1002). The transparent area 300 is located beneath (Y-direction) the orifices 122, which allows light emitted by the emitter 910 to pass therethrough. In some instance, the plane of light may be disposed vertically above a surface on which the electronic device 100 resides, such as approximately between 1 mm and 5 mm above the surface.

FIGS. 26A-26E illustrate areas and/or field of views of various components of the electronic device 100. In some instances, the areas and/or field of views may not be shown at scale relative to a size of the electronic device 100. Additionally, the areas and/or field of views may include sizes and shapes differently than illustrated.

Figure 26A:
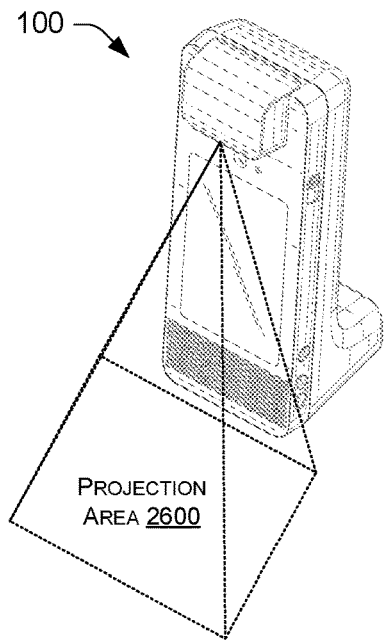
FIG. 26A illustrates an example projection area of a projector of the electronic device of FIG. 1, according to an embodiment of the present disclosure.

Beginning with FIG. 26A, a projection area 2600 of the projector 800 is shown. The projection area 2600 corresponds to an area in front of the electronic device 100 in which the projector 800 projects content. For example, content (e.g., mark ups, alterations, etc.) received from a remote device may be projected within the projection area 2600. In some instance, the projection area 2600 may be between approximately 10 and 15 inches wide (X-direction) and 15-30 inches long (Z-direction). Discussed above, the projection area 2600 may correspond to the shared space within which user(s) interact.

Figure 26B:
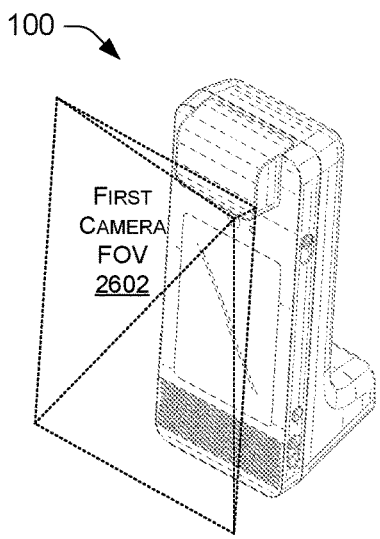
FIG. 26B illustrates an example field of view of a first camera of the electronic device of FIG. 1, according to an embodiment of the present disclosure.

FIG. 26B illustrates a field of view (FOV) 2602 of the first camera 112. The first camera 112 is arranged to capture images and/or videos of the user of the electronic device 100, which may be positioned in front of the electronic device 100. As such, the first camera 112 is arranged to capture images and/or videos in front of the electronic device 100. In some instances, the first camera 112 may be a wide-angle camera.

Figure 26C:
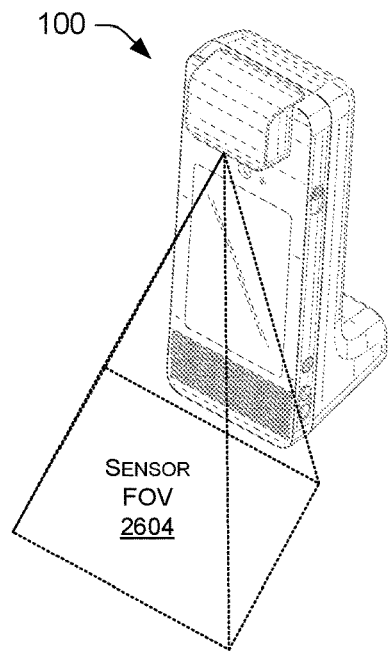
FIG. 26C illustrates an example field of view of a sensor of the electronic device of FIG. 1, according to an embodiment of the present disclosure.
Figure 26D:
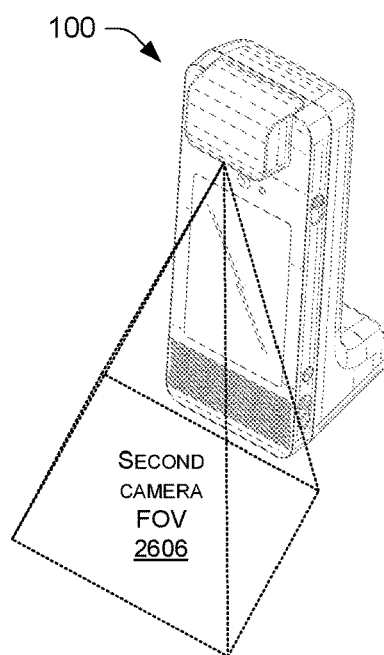
FIG. 26D illustrates an example field of view of a second camera of the electronic device of FIG. 1, according to an embodiment of the present disclosure.
Figure 26E:
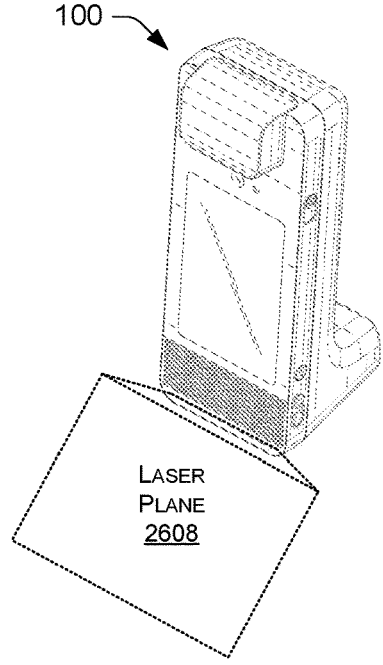
FIG. 26E illustrates an example field of view of an emitter of the electronic device of FIG. 1, according to an embodiment of the present disclosure.

FIG. 26C illustrates a sensor FOV 2604 of the sensor 804 for capturing interactions the user with the plane of light emitted by the emitter 910, as shown in FIG. 26E. In some instances, the sensor FOV 2604 may correspond, or be associated with, the projection area 2600. In doing so, within the projection area 2600, the user may interact with content and such interactions may be detected by the sensor 804.

FIG. 26D illustrates a FOV 2606 of the second camera 802. The second camera 802 is arranged to capture images and/or videos of the interactions of the user of the electronic device 100, within the projection area 2600, or within the shared space. As such, the second camera 802 is arranged to capture images and/or videos in front of the electronic device 100. In some instances, the FOV 2606 of the second camera 802 may correspond, or be associated with, the projection area 2600.

Lastly, FIG. 26E illustrates a laser plane 2608 in front of the electronic device 100. The laser plane 2608 corresponds to a plane of light emitted by the emitter 910. As the user of the electronic device 100 interacts with content, such as content within the projection area 2600 (or the shared space), the sensor 804 may detect reflections for determining a position of the interaction. That is, light as emitted by the emitter 910 is sensed by the sensor 804 as the user interacts within the projection area 2600 and crosses the laser plane 2608. In some instances, the laser plane may correspond, or be associated with, the projection area 2600.

In some instances, the projection area 2600, the sensor FOV 2604, the second camera FOV 2606, and/or the laser plane 2608 may be offset from the front 106 of the electronic device 100 by approximately one inch (Z-direction). Moreover, in some instances, the projection area 2600, the sensor FOV 2604, the second camera FOV 2606, and/or the laser plane 2608 may include a width (X-direction) that is greater than a length (Z-direction). In some instances, the projection area 2600, the sensor FOV 2604, the second camera FOV 2606, and/or the laser plane 2608 may include a width that is approximately or substantially between 10 and 20 inches and a height that is approximately or substantially between 10 inches and 15 inches. However, the projection area 2600, the sensor FOV 2604, the second camera FOV 2606, and/or the laser plane 2608 may be oriented differently or may include different relative dimensions than shown. For example, the projection area 2600, the sensor FOV 2604, the second camera FOV 2606, and/or the laser plane 2608 may include a length that is greater than the width.

Figure 27:
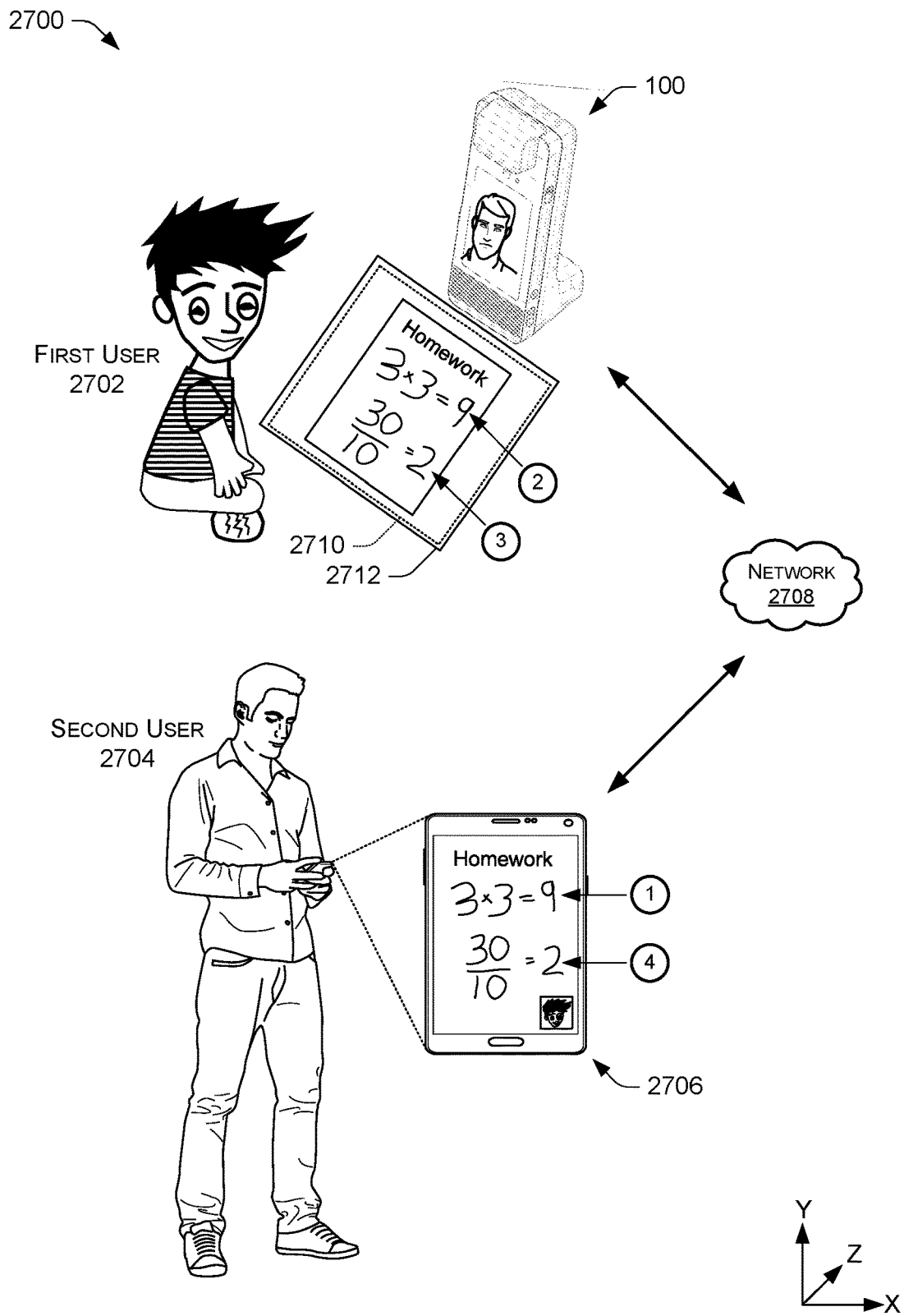
FIG. 27 illustrates an example environment for utilizing the electronic device of FIG. 1 to interact with a remote device, according to an embodiment of the present disclosure.

FIG. 27 illustrates an example environment 2700 for using the electronic device 100 to interact among users. For example, a first user 2702 is shown interacting with the electronic device 100 to communicate with a second user 2704, who interacts with a remote device 2706. Although the remote device 2706 is illustrated as a mobile device, such as a phone, the remote device 2706 may include a tablet, laptop, another electronic device, and so forth. The first user 2702 may be located in a first location and the second user 2704 may be located in a second location that is remote from the first location. The electronic device 100 and the remote device 2706 are shown being in communication via a network 2708, such as the Internet. In doing so, the electronic device 100 may send and receive information to and from the remote device 2706, enabling interactivity between the first user 2702 and the second user 2704.

The electronic device 100 and the remote device 2706 may to provide an immersive and interactive experience for the first user 2702 and the second user 2704. For example, the electronic device 100 is shown including a shared space 2710 through which the first user 2702 and the second user 2704 may interact. As illustrated, the first user 2702 may place a piece of homework within the shared space 2710. A camera, such as the second camera 802, of the electronic device 100 may capture image data corresponding to the piece of homework. The second camera 802 may be oriented downward, towards a bottom of the electronic device 100, or towards the surface, for observing content within the shared space 2710. The electronic device 100 may then transmit the image data to the remote device 2706 for output. For example, as illustrated, the piece of homework may be output on a display (e.g., screen) of the remote device 2706.

The electronic device 100 further includes microphones for capturing speech of the first user 2702 and loudspeakers for outputting audio associated with the second user 2704.

The electronic device 100 further includes a camera, such as the first camera 112, for capturing image data of the first user 2702. The first camera 112 may be oriented towards a front of the electronic device 100 for capturing image data of the first user 2702. This image data may then be transmitted to the remote device 2706 for output. For example, the remote device 2706, in addition to displaying the piece of homework, may include a portion for outputting the image data of the first user 2702. Likewise, the electronic device 100 may output image data depicting the second user 2704 on the display 110. Presenting image data of the second user 2704 may increase the immersive experience between the first user 2702 and the second user 2704.

To sense interactions within the shared space 2710, the electronic device 100 includes the emitter 910 and the sensor 804. The emitter 910 broadcast a plane of light across the shared space 2710 for sensing inputs of the first user 2702. The sensor 804 may detect the touch or interactions through the scattering of IR light as the first user 2702 breaks, or crosses, the plane of light. That is, as the first user 2702 works on the piece of homework, the location of the input may be sensed by the sensor 807 detecting the scattering of light. In turn, the electronic device 100 may transmit data to the remote device 2706.

Expounding on the example illustrated in FIG. 27, the second user 2704 may monitor the progress of the first user 2702 at the remote device 2706. That is, the second user 2704 may interact with the first user 2702 by interacting with the remote device 2706 and such interactions may be presented by the electronic device 100, within the shared space 2710. For example, at "1" the second user 2704 may assist the first user 2702 in solving the math problem "3×3" by entering "9." This input (e.g., touch input) may be sensed by the remote device 2706 and transmitted to the electronic device 100 for output. For example, at "2" the electronic device 100 may display the answer "9" on the piece of homework to indicate the action by the second user 2704. The electronic device 100 may present the answer "9" by projecting content via the projector 800. As part of this interaction the first user 2702 and the second user 2704 may engage in other forms of interaction, such as speech and video.

Similarly, the first user 2702 may interact within the shared space 2710, attempting to solve the math problem "30/10." For example, at "3" the first user 2702 may enter answer of "2." In some instances, the first user 2702 may provide the answer "2" using a pencil, for example, by drawing on the piece of homework. The second camera 802 may capture this input by first user 2702 and transmit associated image data to the remote device 2706. Moreover, the sensor 804 of the electronic device 100 may determine a location associated with the touch input through detecting scattering light emitted by the emitter 910. The electronic device 100 may capture motions associated with the first user 2702 within the shared space 2710 for transmitting to the remote device 2706. In turn, at "4" the remote device 2706 may display the answer as answered by the first user 2702. However, given that the answer "2" is incorrect, the second user 2704 may interact with the first user 2702 for correcting the mistake. For example, the second user 2704 may provide assistance by drawing on the remote device 2706, verbally explaining the correct answer, and so forth.

In some instances, the electronic device 100 may be used along with a mat 2712 that is placed on a surface on which the electronic device 100 resides. For example, certain surfaces may be difficult to project image(s) onto (e.g., uneven surfaces, wood grain, etc.). In these instances, content presented by the projector 800 may become skewed or distorted. The mat 2712 may provide an even surface for projecting content. In some instances, the mat 2712 may be sized according to the shared space 2710, or may be sized slightly larger than the shared space 2710. For example, the mat 2712 may include a width between approximately 15 inches and 25 inches (X-direction), and a length between approximately 10 inches and 15 inches. In some instances, the mat 2712 may include materials with reflective surface(s) to reflect light diffusely. In these instances, the material of the mat 2712 may reflect incident light at many angles (i.e., diffuse reflection), rather than at just one angle (i.e., specular reflection). This may increase a viewing experience of users interacting with the electronic device 100 and the mat 2712. For example, diffuse reflection may allow users to view a bright, vivid image of content projected by the projector 800. Comparatively, materials or finishes with specular reflection may result in perceived glares by the user.

The material of the mat 2712 may include, but is not limited to, polymers, foams, rubber, composites, etc. Additionally, materials may be surface treated to be reflective and/or with certain colors to display projected content (e.g., white). For example, a surface of the mat 2712 may include a low coefficient of friction for reducing drag, stickiness, or pull during swiping actions by the first user 2702. The mat 2712 may be compact and/or easily stored when not in use (e.g., folded, rolled, etc.). The mat 2712 may also include indents, cutouts, or other features for aligning the mat 2712 with the electronic device 100.

Accordingly, FIG. 27 illustrates a scenario in which the electronic device 100 and the remote device may mirror inputs provided by the first user 2702 and the second user 2704, respectively, to facilitate interactions between remote locations.

Figure 28:
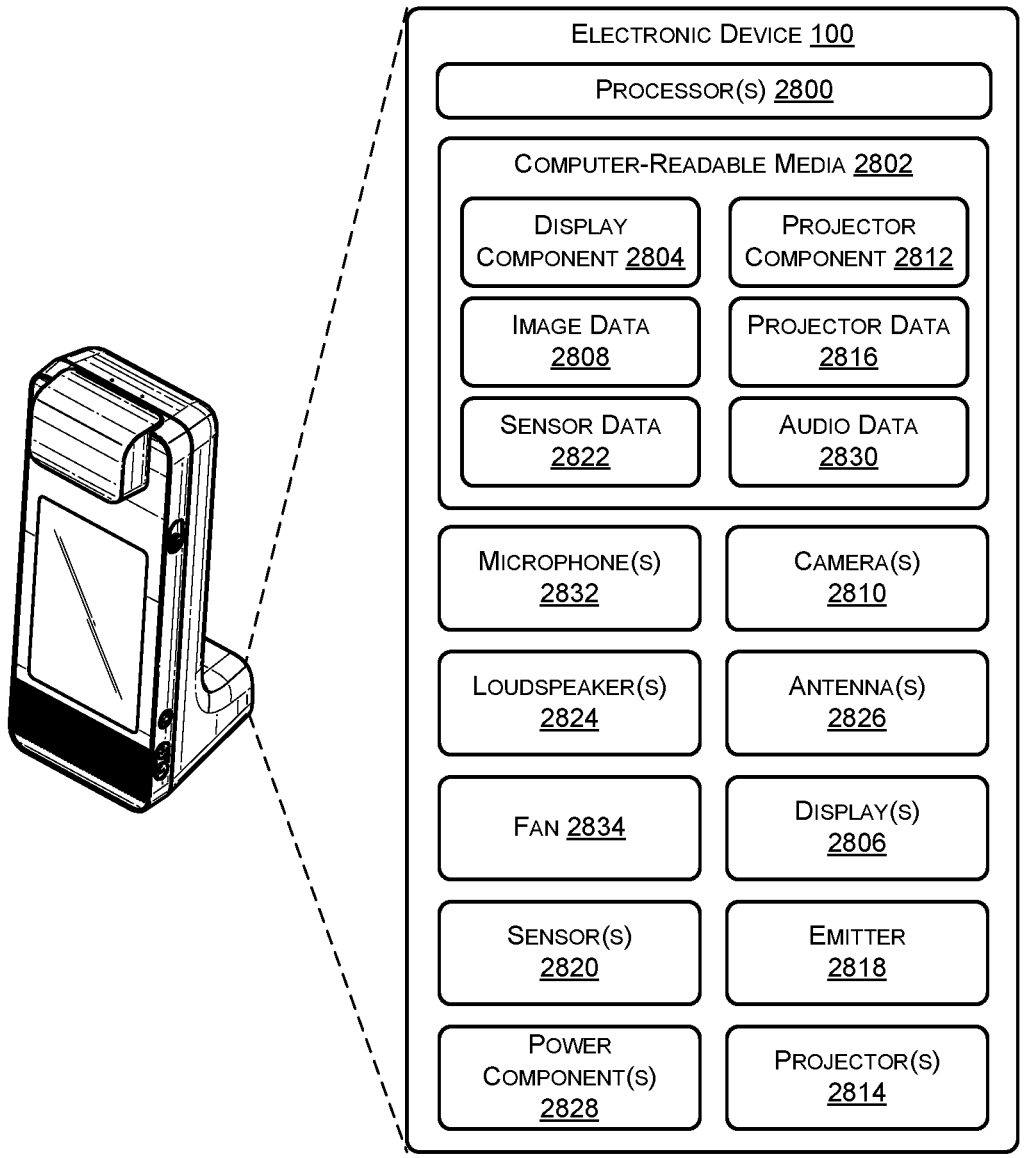
FIG. 28 illustrates example computing components of the electronic device of FIG. 1, according to an embodiment of the present disclosure.

FIG. 28 illustrates example computing components of the electronic device 100. The electronic device 100 may include one or more processor(s) 2800 and computer-readable media 2802. Several components such as instructions, data stores, and so forth can be stored within the computer-readable media 2802 and configured to execute on the processor(s) 2800. A few example functional components are shown as applications stored in the computer-readable media 2802 and executed on the processor(s) 2800, although the same functionality can alternatively be implemented in hardware, firmware, or as a system on a chip (SOC).

A display component 2804 is configured to control one or more display(s) 2806 of the electronic device 100 (e.g., the display 110). For example, the electronic device 100 may receive image data 2808 representing image(s) and/or video(s) received from remote device(s) (e.g., tablet, mobile phone, laptop, etc.). The display component 2804 may cause the display(s) 2806 to output the image data 2808 on the display 110, for viewing by user(s) of the electronic device 100. In some instances, the display(s) 2806 may include high-resolution displays, e-ink displays, tactile electronic displays (e.g., refreshable Braille displays), segment displays, LED displays, LCDs, laser displays, holographic displays, and the like. Additionally, the display(s) 2806 may be touch-sensitive and capable of receiving touch input from the user(s). For example, the display(s) 2806 may include one or more touch screens and/or capacitive sensing.

The image data 2808 may also correspond to image(s) and/or video(s) captured by camera(s) 2810 of the electronic device 100 (e.g., the first camera 112, the second camera 802, etc.). For example, the electronic device 100 may include a first camera for capturing image(s) and/or video(s) of the user(s) of the electronic device 100. Image(s) and/or video(s) captured by the first camera may be transmitted to the remote device(s) to provide an immersive experience between user(s) of the electronic device 100 and user(s) of remote device(s). Additionally, the electronic device 100 may include a second camera for capturing content presented by the user(s) of the electronic device 100 within the shared space. The shared space may represent an area in front of the electronic device 100 whereby the user(s) may provide content or materials (e.g., homework, drawing, book, etc.) for interacting with the user(s) of the remote device(s). Within this shared space, the second camera may capture content presented or shared by the user(s) of the electronic device 100. By way of example, if the user(s) present a piece of homework, the second camera may capture image data 2808 associated with the homework and transmit the image data 2808 to the remote device(s) for viewing. In some instances, the camera(s) 2810 may include a high-resolution camera, a depth sensor, IR sensor, RGB camera, and/or other imagining devices and/or sensors.

A projector component 2812 is configured to control one or more projectors 2814 of the electronic device 100 (e.g., the projector 800). For example, the electronic device 100 may receive projector data 2816 representing content received from remote device(s). The content may correspond to interactions made by user(s) of the remote device(s). For example, the user(s) of the remote device(s) may interact with first user(s) of the electronic device 100. By way of illustration, if the user(s) of the electronic device 100 and the user(s) of the remote device are working on homework, the user(s) of the remote device may provide interactions associated with solving a math problem. The remote device(s) may capture these interactions, and the projector component 2812 may output content associated with these interactions (i.e., the projector data 2816). Moreover, this projected content may be overlaid or presented on top of material (e.g., homework) within the shared space. As such, the projector component 2812 may receive projector data 2816 for being projected by the projector 800.

To sense interactions made by the user(s) of the electronic device 100, the electronic device 100 may include an emitter 2818 (e.g., the emitter 910) and sensor(s) 2820 (e.g., the sensor 804). The emitter 2818 may output a plane of light in front of the electronic device 100, within the shared space. The plane of light is invisible to the user(s) and may run parallel to a surface on which the electronic device 100 resides. As the user(s) interacts within the shared space, the sensor(s) 2820 may detect scattering of the light to determine a position of the interaction. These inputs are captured by the sensor(s) 2820, which generate sensor data 2822. In some instances, the sensor data 2822 may indicate a location of the inputs within the spared space for use in portraying the touch inputs to the user(s) of the remote device(s). For example, continuing with the above example, if the user(s) of the electronic device 100 point to a particular math problem, the sensor(s) 2820 may detect the reflected light for determining a position of the interaction. The electronic device 100 may then transmit these interactions, as well as the images and/or video captured by the camera(s) 2810, to the remote device(s) for output.

The electronic device 100 is further shown including one or more microphone(s) 2832 (e.g., the microphones 600), one or more loudspeaker(s) 2824 (e.g., the loudspeaker 906), one or more antenna(s) 2826, and/or one or more power components 2828. In some implementations, the one or more microphone(s) 2832 may function as input devices to receive audio input, such as user voice input. For example, the user(s) of the electronic device 100 may interact with the user(s) of the remote device through speech, and the one or more microphone(s) 2832 capture the speech. The electronic device 100 may output speech of the user(s) of the remote device (i.e., audio) to the user(s) of the electronic device 100 through the one or more loudspeaker(s) 2824. For example, the electronic device 100 may receive audio data 2830 from the remote device(s) for outputting audio via the loudspeaker(s) 2824. Additionally, the audio data 2830 may represent audio of the user(s) of the electronic device 100 captured by the one or more microphone(s) 2832.

In some instances, the one or more antenna(s) 2826 are configured to send and/or receive wireless signals for communicating with other devices, such as the remote device(s). In some instances, the one or more antenna(s) 2826 may operate in conjunction with one or more wireless units to implement one or more of various wireless technologies, such as Wi-Fi, Bluetooth, RF, cellular, satellite, NFC (near-field communication), RFID (radio frequency identification), and so on. In some instances, the one or more antenna(s) 2826 may be used to communicate wirelessly with one or more remote device(s) via a network such as the internet. In some instances, the electronic device 100 may communicate in a mesh network (e.g., directly between remote device(s)) and/or via an access point.

In some instances, the one or more power components 2828 provide electrical power to the electronic device 100. In some instances, the power components 2828 may include one or more batteries, capacitors, inductors, chargers, ports, etc. to receive and store power. In some instances, the power components 2828 may include contact charging or inductive charging systems to receive power from a variety of mechanisms. In some instances, the one or more power components 2828 may include a port to receive mains power.

A fan 2834 (e.g., the fan 902) is further included to dissipate head generated by components of the electronic device 100. The fan 2834, for example, may operate to intake air, circulate air within an interior of the electronic device 100, and vent the heated air out of the electronic device 100.

The electronic device 100 may further include, in some instances, a speech-recognition component that employs any number of conventional speech processing techniques such as use of speech recognition, natural-language understanding, and extensive lexicons to interpret voice input. In some instances, the speech-recognition component may simply be programmed to identify the user uttering a predefined word or phrase (e.g., a "wake word"), after which the electronic device 100 may begin uploading data to a network device for more robust speech-recognition processing. In other examples, the electronic device 100 itself may, for example, identify voice commands from user(s) and provide indications of these commands to the network device. The electronic device 100 may also include a plurality of applications or games stored in the computer-readable media 2802 or otherwise accessible to the electronic device 100.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. An electronic device, comprising:
a housing defining a first channel;
a first camera oriented in a first direction;
a second camera oriented in a second direction that is different from the first direction; and
a shutter assembly comprising:
a switch including a protrusion that is disposed at least partially within the first channel, wherein the switch is actuatable between a first position in which the first camera and the second camera are unobstructed, and a second position in which the first camera and the second camera are (i) obstructed and (ii) disabled;
a link operably coupled to the switch, the link defining a second channel;
a first cover coupled to the link, the first cover for obstructing the first camera; and
an arm coupled to the link, the arm including: (i) a pin configured to translate within the second channel during actuation of the switch, and (ii) a second cover for obstructing the second camera.

2. The electronic device of claim 1, wherein:
the switch includes a first projection and a second projection;
the housing includes a first protrusion and a second protrusion;
the first projection engages with the first protrusion in the first position; and
the second projection engages with the second protrusion in the second position.

3. The electronic device of claim 1, wherein:
the switch is configured to translate in a third direction between the first position and the second position; and
actuating the switch in the third direction translates the arm in a fourth direction that is different than the third direction.

4. The electronic device of claim 3, wherein the second channel includes a substantially serpentine path that extends in both the third direction and the fourth direction.

5. A device, comprising:
a first camera;
a second camera; and
a shutter assembly comprising:
a switch;
a link including a first cover, the link operably coupled to the switch; and
an arm including a second cover, the arm operably coupled to the link,
wherein actuating the switch in a first direction to a first position:
disposes the first cover within a first field of view of the first camera, and
actuates the link in a second direction, different than the first direction, to dispose the second cover within a second field of view of the second camera, and
wherein actuating the switch in a third direction, opposite the first direction, to a second position:
disposes the first cover outside of the first field of view, and
actuates the link in a fourth direction, different than the third direction, to dispose the second cover outside of the second field of view.

6. The device of claim 5, wherein:
the link includes a first end and a second end, the first end operably engaging with the switch and the second end including the first cover; and
the arm includes a third end and a fourth end, the third end operably engaging with the link and the fourth end including the second cover.

7. The device of claim 5, wherein:
the link defines a channel; and
the arm includes a projection configured to translate within the channel for actuating the arm to dispose the second cover within the second field of view and outside of the second field of view.

8. The device of claim 5, wherein the arm defines a first passage and a second passage, further comprising a first fastener disposed at least partially through the first passage and a second fastener disposed at least partially through the second passage, and wherein:
the first fastener translates between first ends of the first passage; and the second fastener translates between second ends of the second passage.

9. The device of claim 5, wherein:
the second direction is substantially orthogonal to the first direction;
the fourth direction is substantially orthogonal to the third direction; and
the fourth direction is opposite the second direction.

10. The device of claim 5, further comprising a housing, wherein:
the switch includes a first projection and a second projection;
the housing includes a first protrusion and a second protrusion;
the first projection engages with the first protrusion in the first position; and
the second projection engages with the second protrusion in the second position.

11. The device of claim 5, wherein:
the first camera is oriented in a first direction; and
the second camera is oriented in a second direction that is different than the first direction.

12. The device of claim 5, further comprising a housing including a channel, wherein the switch includes a protrusion that is actuatable within the channel, between the first position and the second position.

13. The device of claim 5, further comprising:
a second switch;
one or more processors; and
one or more non-transitory computer-readable media storing computer-executable instructions that, when executed by the one or more processors, cause the one or more processors to perform acts comprising:
receiving, from the second switch, first data associated with the switch positioned in the first position;
based at least in part on the first data, enabling the first camera and the second camera;
receiving, from the second switch, second data associated with the switch positioned in the second position; and
based at least in part on the second data, disabling the first camera and the second camera.

14. An audiovisual electronic device, comprising:
a first camera oriented substantially outwards from a front of the audiovisual electronic device;
a second camera oriented substantially downwards towards a bottom of the audiovisual electronic device;
a shutter assembly including a switch, the switch being actuatable between a first position in which the first camera and the second camera are unobstructed, and a second position in which the first camera and the second camera are obstructed;
a sensor;
one or more processors; and
one or more non-transitory computer-readable media storing computer-executable instructions that, when executed by the one or more processors, cause the one or more processors to perform acts comprising:
receiving, from the sensor, first data associated with the switch positioned in the first position;
based at least in part on the first data, enabling the first camera and the second camera by permitting a supply of power;
receiving, from the sensor, second data associated with the switch positioned in the second position; and
based at least in part on the second data, disabling the first camera and the second camera by restricting the supply of power.

15. The audiovisual electronic device of claim 14, wherein the shutter assembly comprises:
a link operably coupled to the switch, the link including:
a first cover for obstructing the first camera, and
a channel having a substantially serpentine path; and
an arm operably coupled to the switch, the arm including:
a second cover for obstructing the second camera, and
a projection that translates within the channel for actuating the second cover.

16. The audiovisual electronic device of claim 14, wherein:
a first portion of the shutter assembly actuates in a first direction for obstructing the first camera;
a second portion of the shutter assembly actuates in a second direction for obstructing the second camera based on the first portion actuating the first direction;
the first portion actuates in a third direction for unobstructing the first camera; and
the second portion actuates in a fourth direction for unobstructing the second camera based on the first portion actuating in the third direction.

17. The audiovisual electronic device of claim 16, wherein:
the second direction is substantially orthogonal to the first direction;
the third direction is opposite the first direction;
the fourth direction is substantially orthogonal to the third direction; and
the fourth direction is opposite the second direction.

18. The device of claim 5, further comprising:
a speaker; and
a housing in which the first camera and the second camera are disposed, the housing including a first end and a second end opposite the first end,
wherein:
the second camera is located closer to the first end than the switch, and
the speaker is located closer to the second end than at least one of the first camera or the switch.

19. The audiovisual electronic device of claim 14 further comprising a housing including a channel, wherein the switch includes a protrusion that is actuatable within the channel, between a third position and a fourth position.

20. The audiovisual electronic device of claim 14, wherein the switch includes a first indication visible in the first position, and a second indication visible in the second position, the second indication being different than the first indication.

* * * * *